United States Patent
Goldston et al.

(10) Patent No.: US 11,576,465 B2
(45) Date of Patent: Feb. 14, 2023

(54) SHOES, DEVICES FOR SHOES, AND METHODS OF USING SHOES

(71) Applicant: Athletic Propulsion Labs LLC, Beverly Hills, CA (US)

(72) Inventors: Mark R. Goldston, Beverly Hills, CA (US); Ryan Goldston, Los Angeles, CA (US); Adam Goldston, Los Angeles, CA (US)

(73) Assignee: Athletic Propulsion Labs LLC, Beverly Hills, CA (US)

( * ) Notice: Subject to any disclaimer, the term of this patent is extended or adjusted under 35 U.S.C. 154(b) by 0 days.

(21) Appl. No.: 17/503,793

(22) Filed: Oct. 18, 2021

(65) Prior Publication Data
US 2022/0369764 A1 Nov. 24, 2022

Related U.S. Application Data

(60) Provisional application No. 63/190,180, filed on May 18, 2021.

(51) Int. Cl.
*F16F 1/36* (2006.01)
*A43B 13/18* (2006.01)
(Continued)

(52) U.S. Cl.
CPC ............ *A43B 13/181* (2013.01); *F16F 1/368* (2013.01); *F16F 3/10* (2013.01); *F16F 2224/0241* (2013.01); *F16F 2238/022* (2013.01)

(58) Field of Classification Search
CPC ...... F16F 1/368; F16F 3/10; F16F 2224/0241; F16F 2238/022; F16F 1/027; F16F 1/187; F16F 1/22; A43B 13/181
(Continued)

(56) References Cited

U.S. PATENT DOCUMENTS 413,693 A 10/1889 Walker
507,490 A 10/1893 Gambino
(Continued)

FOREIGN PATENT DOCUMENTS

CN 2884963 4/2007
CN 200994449 12/2007
(Continued)

OTHER PUBLICATIONS

International Preliminary Report on Patentability for PCT patent application No. PCT/US2010/030012 dated Oct. 11, 2011.
(Continued)

*Primary Examiner* — Xuan Lan Nguyen
(74) *Attorney, Agent, or Firm* — Foley & Lardner LLP

(57) ABSTRACT

A device for use in a shoe includes a first foot, a second foot, a third foot, a fourth foot, a first flexible leg, a second flexible leg, a third flexible leg, and a fourth flexible leg. The first flexible leg extends from the first foot and is curved. The second flexible leg extends from the second foot and is curved. The third flexible leg extends from the third foot and is curved. The fourth flexible leg extends from the fourth foot and is curved. The first flexible leg, second flexible leg, third flexible leg, and fourth flexible leg are joined together with each other at a common area. The first flexible leg, second flexible leg, third flexible leg, and fourth flexible leg are configured to store energy when a force is applied to the common area, and to return energy when the force is removed from the common area.

20 Claims, 10 Drawing Sheets

(51) Int. Cl.
*F16F 1/368* (2006.01)
*F16F 3/10* (2006.01)

(58) Field of Classification Search
USPC ........................................................ 267/182
See application file for complete search history.

(56) References Cited

U.S. PATENT DOCUMENTS

| | | | |
|---|---|---|---|
| 1,010,187 A | 11/1911 | Scott | |
| 1,069,001 A | 7/1913 | Guy | |
| 1,088,328 A | 2/1914 | Cucinotta | |
| 1,502,087 A | 7/1924 | Bunns | |
| 2,109,180 A | 2/1938 | Mohun | |
| 2,303,744 A | 12/1942 | Jacobs | |
| 2,357,281 A | 8/1944 | Williams | |
| 2,394,281 A | 2/1946 | Williams | |
| 2,437,227 A | 3/1948 | Hall | |
| 2,509,980 A | 5/1950 | McCallum | |
| 2,594,665 A * | 4/1952 | Lockwood | F16F 15/073 267/152 |
| 2,682,712 A | 7/1954 | Owsen et al. | |
| 2,721,400 A | 10/1955 | Israel | |
| 2,766,901 A | 10/1956 | Sunko | |
| 3,120,712 A | 2/1964 | Menken | |
| 3,600,743 A | 8/1971 | Meadows | |
| 3,737,155 A * | 6/1973 | Karlan | F16F 1/027 267/140.3 |
| 3,869,752 A | 3/1975 | Klay | |
| 4,016,662 A | 4/1977 | Thompson | |
| 4,364,188 A | 12/1982 | Turner et al. | |
| 4,457,084 A | 7/1984 | Horibata et al. | |
| 4,486,964 A | 12/1984 | Rudy | |
| 4,506,460 A | 3/1985 | Rudy | |
| 4,546,555 A | 10/1985 | Spademan | |
| 4,592,153 A | 6/1986 | Jacinto | |
| 4,603,452 A | 8/1986 | Paciorek | |
| 4,709,489 A | 12/1987 | Welter | |
| 4,771,554 A | 9/1988 | Hannemann | |
| 4,815,221 A | 3/1989 | Diaz | |
| 4,844,519 A | 7/1989 | Dagon | |
| 4,854,057 A | 8/1989 | Misevich et al. | |
| 4,878,300 A | 11/1989 | Bogaty | |
| 4,894,934 A | 1/1990 | Illustrato | |
| 4,901,987 A | 2/1990 | Greenhill et al. | |
| 5,060,401 A | 10/1991 | Whatley | |
| 5,092,060 A | 3/1992 | Frachey et al. | |
| 5,159,767 A | 11/1992 | Allen | |
| 5,203,095 A | 4/1993 | Allen | |
| 5,224,278 A | 7/1993 | Jeon | |
| 5,279,051 A | 1/1994 | Whatley | |
| 5,282,325 A | 2/1994 | Beyl | |
| 5,325,611 A | 7/1994 | Dyer et al. | |
| 5,343,639 A | 9/1994 | Kilgore et al. | |
| D355,755 S | 2/1995 | Kilgore | |
| 5,435,079 A * | 7/1995 | Gallegos | A43B 13/184 36/38 |
| 5,437,110 A | 8/1995 | Goldston et al. | |
| 5,464,197 A | 11/1995 | Ecclesfield | |
| 5,502,901 A | 4/1996 | Brown | |
| 5,513,448 A | 5/1996 | Lyons | |
| 5,572,804 A | 11/1996 | Skaja et al. | |
| 5,588,227 A | 12/1996 | Goldston et al. | |
| 5,596,819 A | 1/1997 | Goldston et al. | |
| 5,622,358 A | 4/1997 | Komura et al. | |
| 5,649,373 A | 7/1997 | Winter et al. | |
| 5,651,196 A | 7/1997 | Hsieh | |
| 5,671,552 A | 9/1997 | Pettibone et al. | |
| 5,706,589 A | 1/1998 | Marc | |
| 5,743,028 A | 4/1998 | Lombardino | |
| 5,845,419 A | 12/1998 | Begg | |
| 5,875,567 A * | 3/1999 | Bayley | A43B 13/182 36/27 |
| 5,896,679 A | 4/1999 | Baldwin | |
| 5,983,529 A | 11/1999 | Serna | |
| 6,006,449 A | 12/1999 | Orlowski et al. | |
| 6,029,374 A | 2/2000 | Herr et al. | |
| 6,029,962 A | 2/2000 | Shorten et al. | |
| 6,041,478 A | 3/2000 | Martin | |
| 6,055,747 A | 5/2000 | Lombardino | |
| D433,216 S | 11/2000 | Avar et al. | |
| 6,282,814 B1 | 9/2001 | Krafsur et al. | |
| 6,336,249 B1 | 1/2002 | Plumley | |
| 6,393,731 B1 * | 5/2002 | Moua | A43B 13/182 36/35 B |
| 6,457,261 B1 | 10/2002 | Crary | |
| 6,530,564 B1 * | 3/2003 | Julien | A43B 13/186 267/80 |
| 6,546,648 B2 | 4/2003 | Dixon | |
| 6,562,427 B2 | 5/2003 | Hung | |
| 6,568,102 B1 | 5/2003 | Healy et al. | |
| 6,662,472 B1 | 12/2003 | Hsu | |
| 6,665,957 B2 * | 12/2003 | Levert | A43B 13/182 36/27 |
| 6,730,379 B2 | 5/2004 | Bonk et al. | |
| 6,751,891 B2 | 6/2004 | Lombardino | |
| 6,860,034 B2 | 3/2005 | Schmid | |
| 6,865,824 B2 | 3/2005 | Levert et al. | |
| 6,886,274 B2 | 5/2005 | Krafsur et al. | |
| D507,094 S | 7/2005 | Lyden | |
| 6,920,705 B2 | 7/2005 | Lucas et al. | |
| 6,928,756 B1 | 8/2005 | Haynes | |
| 6,944,972 B2 | 9/2005 | Schmid | |
| 6,983,553 B2 | 1/2006 | Lussier et al. | |
| 7,100,308 B2 | 9/2006 | Aveni | |
| 7,140,125 B2 | 11/2006 | Singleton et al. | |
| 7,155,844 B2 | 1/2007 | Chu | |
| 7,159,338 B2 | 1/2007 | Levert et al. | |
| 7,171,765 B2 | 2/2007 | Lo | |
| D538,018 S | 3/2007 | Hlavacs | |
| 7,219,447 B2 | 5/2007 | Levert et al. | |
| 7,287,340 B2 | 10/2007 | Talbott | |
| 7,290,354 B2 | 11/2007 | Perenich | |
| 7,418,790 B2 | 9/2008 | Kerrigan | |
| 7,441,347 B2 | 10/2008 | Levert et al. | |
| 7,600,330 B2 | 10/2009 | Chen | |
| 7,900,376 B2 | 3/2011 | Rabushka | |
| 7,950,166 B1 | 5/2011 | Perenich | |
| 8,112,905 B2 | 2/2012 | Bemis et al. | |
| 8,347,526 B2 | 1/2013 | Goldston et al. | |
| 8,495,825 B2 | 7/2013 | Goldston et al. | |
| 8,621,766 B2 | 1/2014 | Goldston | |
| 8,732,983 B2 | 5/2014 | Goldston et al. | |
| 9,044,064 B2 | 6/2015 | Baucom et al. | |
| 9,194,166 B1 | 11/2015 | Spiegel et al. | |
| 9,370,221 B1 | 6/2016 | Hsu et al. | |
| 9,414,642 B2 | 8/2016 | Berend et al. | |
| 10,045,588 B2 | 8/2018 | Berend et al. | |
| 10,687,583 B2 * | 6/2020 | Yoshida | A43B 13/12 |
| 10,959,487 B2 | 3/2021 | Brown | |
| 11,134,738 B2 * | 10/2021 | Grice | A42B 3/069 |
| 2001/0049888 A1 | 12/2001 | Krafsur et al. | |
| 2002/0073579 A1 | 6/2002 | Lombardino | |
| 2002/0133976 A1 | 9/2002 | Crutcher | |
| 2002/0144430 A1 | 10/2002 | Schmid | |
| 2002/0174567 A1 | 11/2002 | Krafsur et al. | |
| 2002/0189134 A1 | 12/2002 | Dixon | |
| 2003/0051372 A1 | 3/2003 | Lyden | |
| 2003/0104164 A1 | 6/2003 | Wu | |
| 2003/0126760 A1 | 7/2003 | Levert et al. | |
| 2003/0163933 A1 | 9/2003 | Krafsur et al. | |
| 2003/0192200 A1 | 10/2003 | Dixon | |
| 2003/0200677 A1 | 10/2003 | Abraham | |
| 2003/0217483 A1 | 11/2003 | Abraham | |
| 2004/0021123 A1 * | 2/2004 | Howell | F16F 1/027 251/337 |
| 2004/0118017 A1 | 6/2004 | Dalton et al. | |
| 2004/0154191 A1 | 8/2004 | Park | |
| 2004/0237340 A1 | 12/2004 | Rembrandt | |
| 2005/0081401 A1 | 4/2005 | Singleton et al. | |
| 2005/0126039 A1 | 6/2005 | Levert et al. | |
| 2005/0138839 A1 | 6/2005 | Terlizzi et al. | |
| 2005/0166422 A1 | 8/2005 | Schaeffer et al. | |
| 2005/0193595 A1 | 9/2005 | Jennings | |

(56) References Cited

U.S. PATENT DOCUMENTS

| | | |
|---|---|---|
| 2005/0241184 A1 | 11/2005 | Levert et al. |
| 2005/0247385 A1 | 11/2005 | Krafsur et al. |
| 2006/0021259 A1 | 2/2006 | Wood et al. |
| 2006/0048412 A1 | 3/2006 | Kerrigan |
| 2006/0065499 A1 | 3/2006 | Smaldone et al. |
| 2006/0075657 A1 | 4/2006 | Chu |
| 2006/0096125 A1 | 5/2006 | Yen |
| 2006/0130371 A1 | 6/2006 | Schneider |
| 2006/0277788 A1 | 12/2006 | Fujii |
| 2007/0039204 A1 | 2/2007 | Wyszynski et al. |
| 2007/0209232 A1 | 9/2007 | Chen |
| 2008/0098619 A1 | 5/2008 | Smaldone et al. |
| 2008/0184596 A1 | 8/2008 | Yu |
| 2008/0209762 A1 | 9/2008 | Krafsur |
| 2008/0263894 A1 | 10/2008 | Nakano |
| 2008/0263899 A1 | 10/2008 | Lee |
| 2008/0271340 A1 | 11/2008 | Grisoni et al. |
| 2008/0313928 A1 | 12/2008 | Adams et al. |
| 2009/0056165 A1 | 3/2009 | Lee |
| 2009/0064536 A1 | 3/2009 | Klassen et al. |
| 2009/0100716 A1 | 4/2009 | Gerber |
| 2009/0113760 A1 | 5/2009 | Dominguez |
| 2009/0282704 A1 | 11/2009 | Park |
| 2010/0251571 A1 | 10/2010 | Woodard |
| 2010/0257752 A1 | 10/2010 | Goldston et al. |
| 2010/0257753 A1 | 10/2010 | Bemis et al. |
| 2011/0005100 A1 | 1/2011 | Smaldone et al. |
| 2011/0314695 A1 | 12/2011 | Tsai |
| 2012/0023784 A1 | 2/2012 | Goldston et al. |
| 2012/0025576 A1* | 2/2012 | Stern .................. F16F 1/26 267/164 |
| 2012/0110871 A1 | 5/2012 | Elnekaveh |
| 2012/0144695 A1 | 6/2012 | McDowell et al. |
| 2012/0204442 A1 | 8/2012 | Elnekaveh |
| 2012/0318574 A1* | 12/2012 | Beer .................. F16F 1/027 174/75 F |
| 2013/0091735 A1 | 4/2013 | Goldston et al. |
| 2013/0118028 A1 | 5/2013 | Yoon |
| 2013/0263471 A1 | 10/2013 | Spinks |
| 2015/0167768 A1 | 6/2015 | Zhao |
| 2015/0181977 A1 | 7/2015 | Klug et al. |
| 2018/0199663 A1 | 7/2018 | Dhanjal |
| 2021/0212892 A1 | 7/2021 | Seo |

FOREIGN PATENT DOCUMENTS

| | | |
|---|---|---|
| EP | 0 552 994 B1 | 7/1993 |
| EP | 1 346 655 B1 | 9/2003 |
| JP | 2011-036394 A | 2/2011 |
| WO | WO-99/38405 A1 | 8/1999 |

OTHER PUBLICATIONS

International Search Report and Written Opinion dated Jul. 27, 2010, from application No. PCT/US2010/030012.
Notice of Allowance and Fee(s) Due for U.S. Appl. No. 13/341,267 dated Jun. 14, 2013.
Notice of Allowance and Fee(s) Due issued for U.S. Appl. No. 12/467,679 dated Nov. 14, 2011.
Notice of Allowance dated Oct. 21, 2013 for U.S. Appl. No. 13/708,883.
Office Action dated May 29, 2013 in Taiwan Application No. 099110809.
Office Action dated Jul. 31, 2013 in U.S. Appl. No. 13/708,883.
Translation of Office Action for Taiwan Application No. 099110809.
U.S. Office Action for U.S. Appl. No. 12/754,333, dated Oct. 25, 2012.
U.S. Office Action for U.S. Appl. No. 12/754,333 dated Jun. 29, 2012.
U.S. Office Action dated Mar. 3, 2014 for U.S. Appl. No. 13/270,153.
U.S. Office Action dated Mar. 4, 2014 for U.S. Appl. No. 14/095,941.
U.S. Final Office Action dated May 7, 2020, from U.S. Appl. No. 16/126,758.
U.S. Non-Final Office Action dated Feb. 14, 2020, from U.S. Appl. No. 16/126,758.
U.S. Non-Final Office Action dated Jul. 30, 2021, from U.S. Appl. No. 17/327,339.
U.S. Non-Final Office Action dated Sep. 14, 2020, from U.S. Appl. No. 16/126,758.
U.S. Notice of Allowance dated Apr. 2, 2014, from U.S. Appl. No. 13/270,153.
U.S. Notice of Allowance dated Apr. 9, 2014, from U.S. Appl. No. 14/095,941.
U.S. Notice of Allowance dated Feb. 23, 2021, from U.S. Appl. No. 16/126,758.
U.S. Notice of Allowance dated Jun. 1, 2018, from U.S. Appl. No. 14/271,197.
U.S. Notice of Allowance dated Mar. 28, 2016, from related U.S. Appl. No. 14/095,950.
U.S. Notice of Allowance dated Nov. 23, 2012, from U.S. Appl. No. 12/754,333.
U.S. Office Action dated Feb. 22, 2013, from U.S. Appl. No. 13/341,267.
U.S. Office Action dated Dec. 22, 2017, from U.S. Appl. No. 14/271,197.
U.S. Office Action dated Jan. 31, 2017, from U.S. Appl. No. 14/271,197.
U.S. Office Action dated Nov. 20, 2015, from U.S. Appl. No. 14/095,950.
U.S. Office Action dated Sep. 6, 2017, from U.S. Appl. No. 14/271,197.
U.S. Office Action dated Sep. 7, 2011, from U.S. Appl. No. 12/467,679.
Restriction Requirement dated Oct. 21, 2021, from U.S. Appl. No. 17/374,383.
U.S. Non-Final Office Action dated Nov. 23, 2021, from U.S. Appl. No. 17/374,383.
U.S. Notice of Allowance dated Nov. 12, 2021, from U.S. Appl. No. 17/327,339.
International Search Report and Written Opinion dated Jan. 18, 2022, from application No. PCT/US2021/055449, 11 pages.
U.S. Final Office Action dated Mar. 4, 2022, from U.S. Appl. No. 17/374,383.
U.S. Non-Final Office Action dated May 2, 2022, from U.S. Appl. No. 17/553,556.
U.S. Final Office Action dated Aug. 10, 2022, from U.S. Appl. No. 17/553,556.

* cited by examiner

SHOES, DEVICES FOR SHOES, AND METHODS OF USING SHOES

CROSS-REFERENCE TO RELATED PATENT APPLICATIONS

This application claims priority from U.S. Provisional Patent App. Ser. No. 63/190,180, filed May 18, 2021, the entire contents of which are incorporated by reference herein.

FIELD

Embodiments of the present invention relate in general to footwear, and particularly to energy absorption and return systems for use in footwear.

BACKGROUND

In prior U.S. Pat. No. 10,085,514, filed May 6, 2014, by Goldston et al., which issued on Oct. 2, 2018, a discussion was provided of the desirability of providing for energy shock absorption and energy return by shoes. The entire contents of U.S. Pat. No. 10,085,514 are incorporated by reference herein.

SUMMARY OF THE DISCLOSURE

A device in accordance with an embodiment for use in a shoe includes a first foot, a second foot, a third foot, and a fourth foot, and a first flexible leg, a second flexible leg, a third flexible leg, and a fourth flexible leg. The first flexible leg extends from the first foot and is curved. The second flexible leg extends from the second foot and is curved. The third flexible leg extends from the third foot and is curved. The fourth flexible leg extends from the fourth foot and is curved. In various embodiments, the first flexible leg, the second flexible leg, the third flexible leg, and the fourth flexible leg are joined together with each other at a common area. The first flexible leg, the second flexible leg, the third flexible leg, and the fourth flexible leg are configured to store energy when a force is applied to the common area, and are configured to return energy when the force is removed from the common area.

In various embodiments, the first foot, the second foot, the third foot, the fourth foot, the first flexible leg, the second flexible leg, the third flexible leg, and the fourth flexible leg are formed as a single unit. In some embodiments, the single unit is formed of carbon fiber. In some embodiments, the single unit is formed of one or more of carbon fiber, poly-paraphenylene terephthalamide (known as Kevlar®), styrene, and/or a thermoplastic elastomer such as a polyether block amide (PEBA) material known as Pebax® that is manufactured by ARKEMA. In various embodiments, the common area is at a central location with respect to locations of the first foot, the second foot, the third foot, and the fourth foot. In various embodiments, the common area is raised in height as compared to a corresponding top surface of each of the first foot, the second foot, the third foot, and the fourth foot. In some embodiments, the first flexible leg, the second flexible leg, the third flexible leg, and the fourth flexible leg each comprise one or more of carbon fiber, poly-paraphenylene terephthalamide (known as Kevlar®), styrene, and/or a thermoplastic elastomer such as a polyether block amide (PEBA) material known as Pebax®, or other suitable material. In various embodiments, the device is at least partially located in an opening in a midsole of a shoe.

In various embodiments, the device further includes a spring extending from a bottom surface of the common area. In some embodiments, the device further includes a first spring extending from a bottom surface of the first foot, a second spring extending from a bottom surface of the second foot, a third spring extending from a bottom surface of the third foot, and a fourth spring extending from a bottom surface of the fourth foot. In further embodiments, the device includes a fifth spring extending from a bottom surface of the common area. In various embodiments, the first flexible leg and the third flexible leg together form a first arch. In various embodiments, the second flexible leg and the fourth flexible leg together form a second arch. In some embodiments, a center of the first arch and a center of the second arch are joined together at the common area.

A shoe in accordance with an embodiment includes a midsole and a device located at least partially in an opening in the midsole. In various embodiments, the device includes a first foot, a second foot, a third foot, and a fourth foot, a first flexible leg that extends from the first foot and is curved, a second flexible leg that extends from the second foot and is curved, a third flexible leg that extends from the third foot and is curved, and a fourth flexible leg that extends from the fourth foot and is curved. In various embodiments, the first flexible leg, the second flexible leg, the third flexible leg, and the fourth flexible leg are joined together with each other at a common area.

A method of using a device in a shoe in accordance with an embodiment includes applying force to a common area at which a first flexible leg, a second flexible leg, a third flexible leg, and a fourth flexible leg of the device are joined together to cause a first spring located under a first foot connected to the first flexible leg to compress, and to cause a second spring located under a second foot connected to the second flexible leg to compress, and to cause a third spring located under a third foot connected to the third flexible leg to compress, and to cause a fourth spring located under a fourth foot connected to the fourth flexible leg to compress, and to cause a fifth spring located under the common area to compress, and to cause the first flexible leg, the second flexible leg, the third flexible leg, and the fourth flexible leg to flex to a flexed position, so as to store potential energy. In various embodiments, the method further includes releasing the force from the common area to allow the first spring, the second spring, the third spring, the fourth spring, and the fifth spring to stretch, and to allow the first flexible leg, the second flexible leg, the third flexible leg, and the fourth flexible leg to return back from the flexed position, so as to return energy.

A device in accordance with another embodiment for use in a shoe includes a first foot, a second foot, a third foot, and a fourth foot, and a first flexible leg, a second flexible leg, a third flexible leg, and a fourth flexible leg. The first flexible leg extends from the first foot and is curved. The second flexible leg extends from the second foot and is curved. The third flexible leg extends from the third foot and is curved. The fourth flexible leg extends from the fourth foot and is curved. The first flexible leg and the third flexible leg are joined together with each other as a single unit to form a first arch from the first foot to the third foot. The second flexible leg and the fourth flexible leg are joined together with each other as a single unit to form a second arch from the second foot to the fourth foot. The second arch has a center portion that is located under a center portion of the first arch.

In various embodiment, the device further includes a spring extending from a bottom surface of the center portion of the second arch. In various embodiments, the device further includes a first spring extending from a bottom surface of the first foot, a second spring extending from a bottom surface of the second foot, a third spring extending from a bottom surface of the third foot, and a fourth spring extending from a bottom surface of the fourth foot. In some embodiments, the device further includes a fifth spring extending from a bottom surface of the center portion of the second arch.

A shoe in accordance with another embodiment includes a midsole and a device located at least partially in an opening in the midsole. The device includes a first foot, a second foot, a third foot, and a fourth foot, and a first flexible leg, a second flexible leg, a third flexible leg, and a fourth flexible leg. The first flexible leg extends from the first foot and is curved. The second flexible leg extends from the second foot and is curved. The third flexible leg extends from the third foot and is curved. The fourth flexible leg extends from the fourth foot and is curved. The first flexible leg and the third flexible leg are joined together with each other to form a first arch from the first foot to the third foot. The second flexible leg and the fourth flexible leg are joined together with each other to form a second arch from the second foot to the fourth foot. The second arch has a center portion that is located under a center portion of the first arch. In various embodiments, the device further includes a first spring extending from a bottom surface of the first foot, a second spring extending from a bottom surface of the second foot, a third spring extending from a bottom surface of the third foot, a fourth spring extending from a bottom surface of the fourth foot, and a fifth spring extending from a bottom surface of the center portion of the second arch.

A method in accordance with an embodiment of using the device in a shoe includes applying force to the center portion of the first arch to cause force to be applied to the center portion of the second arch, and to cause the first spring located under the first foot connected to the first flexible leg to compress, and to cause the second spring located under the second foot connected to the second flexible leg to compress, and to cause the third spring located under the third foot connected to the third flexible leg to compress, and to cause the fourth spring located under the fourth foot connected to the fourth flexible leg to compress, and to cause the fifth spring located under the center portion of the second arch to compress, and to cause the first flexible leg, the second flexible leg, the third flexible leg, and the fourth flexible leg to flex to a flexed position, so as to store potential energy. In various embodiments, the method further includes releasing the force from the center portion of the first arch to allow the first spring, the second spring, the third spring, the fourth spring, and the fifth spring to stretch, and to allow the first flexible leg, the second flexible leg, the third flexible leg, and the fourth flexible leg to return back from the flexed position, so as to return energy. In various embodiments, the center portion of the second arch is located below the center portion of the first arch.

BRIEF DESCRIPTION OF THE DRAWINGS

FIG. 5A shows an uncompressed state,
FIG. 5B shows a state when the device is under pressure,
and FIG. 5C shows a state when the device has bounced back.

DETAILED DESCRIPTION

Figure 1:
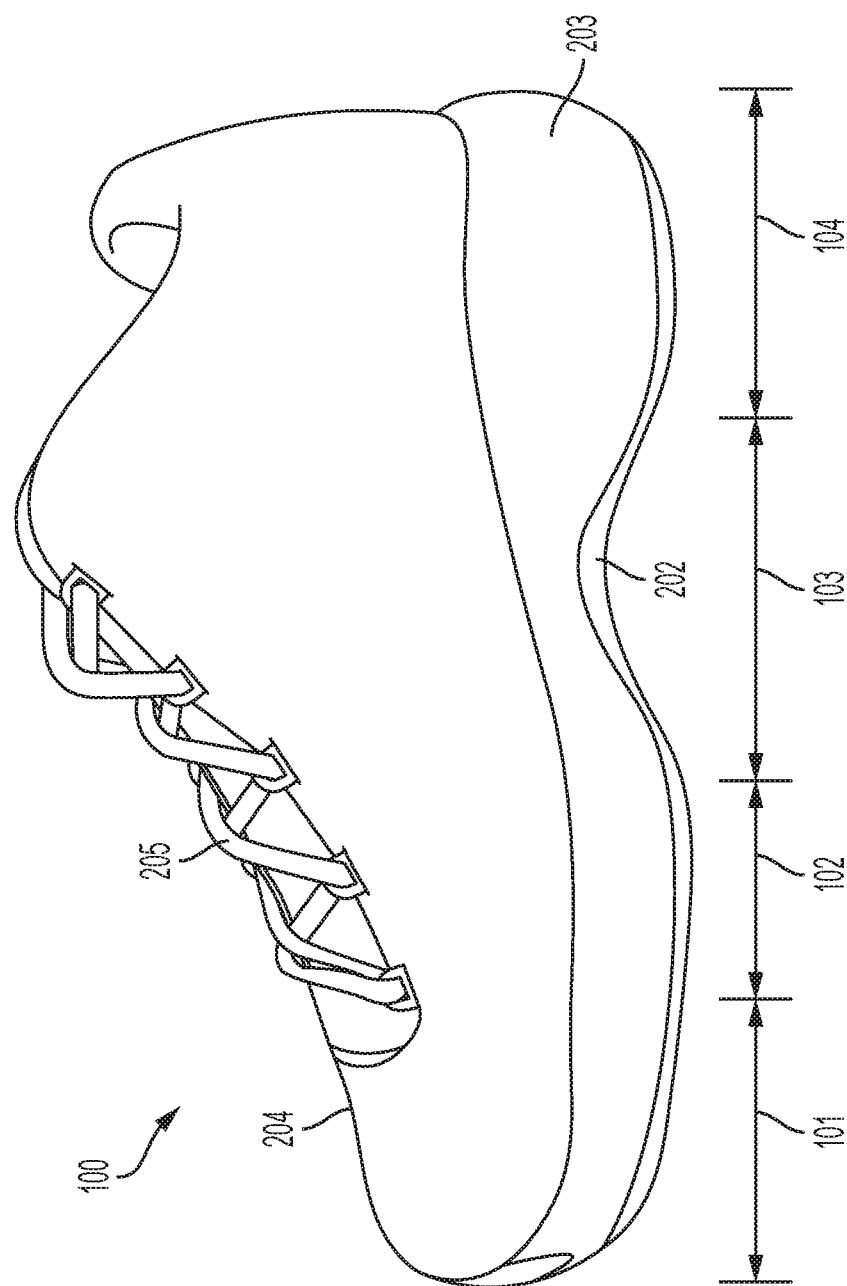
FIG. 1 shows a shoe in accordance with an embodiment.

FIG. 1 shows a shoe 100 in accordance with an embodiment. The shoe 100 includes an outsole 202, a midsole 203, an upper 204, and a fastening member 205. The shoe 100 has various portions, including a forefoot portion 101, a ball portion 102, an arch portion 103, and a heel portion 104. The outsole 202 is designed to be placed on the ground in normal operation of the shoe 100. The upper 204 includes an opening for a foot of a user and means for tightening the shoe 100 around the foot of the user, such as the fastening member 205, which may be, for example, laces, a zipper, or the like.

The forefoot portion 101 of the shoe 100 is located at the front of the shoe 100, and the forefoot portion 101 may support the toes of a foot of a human when the foot of the human is inserted into the shoe 100. The ball portion 102 is located adjacent to the forefoot portion 101, and the ball portion 102 may support the ball of a foot of a human when the foot of the human is inserted into the shoe 100. The arch portion 103 is located adjacent to the ball portion 102, and may provide support to an arch of a foot of a human when the foot of the human is inserted into the shoe 100. The heel portion 104 is located adjacent to the arch portion 103 and at the rear of the shoe 100, and may provide support to a heel of a foot of a human when the foot of the human is inserted into the shoe 100.

Figure 2:
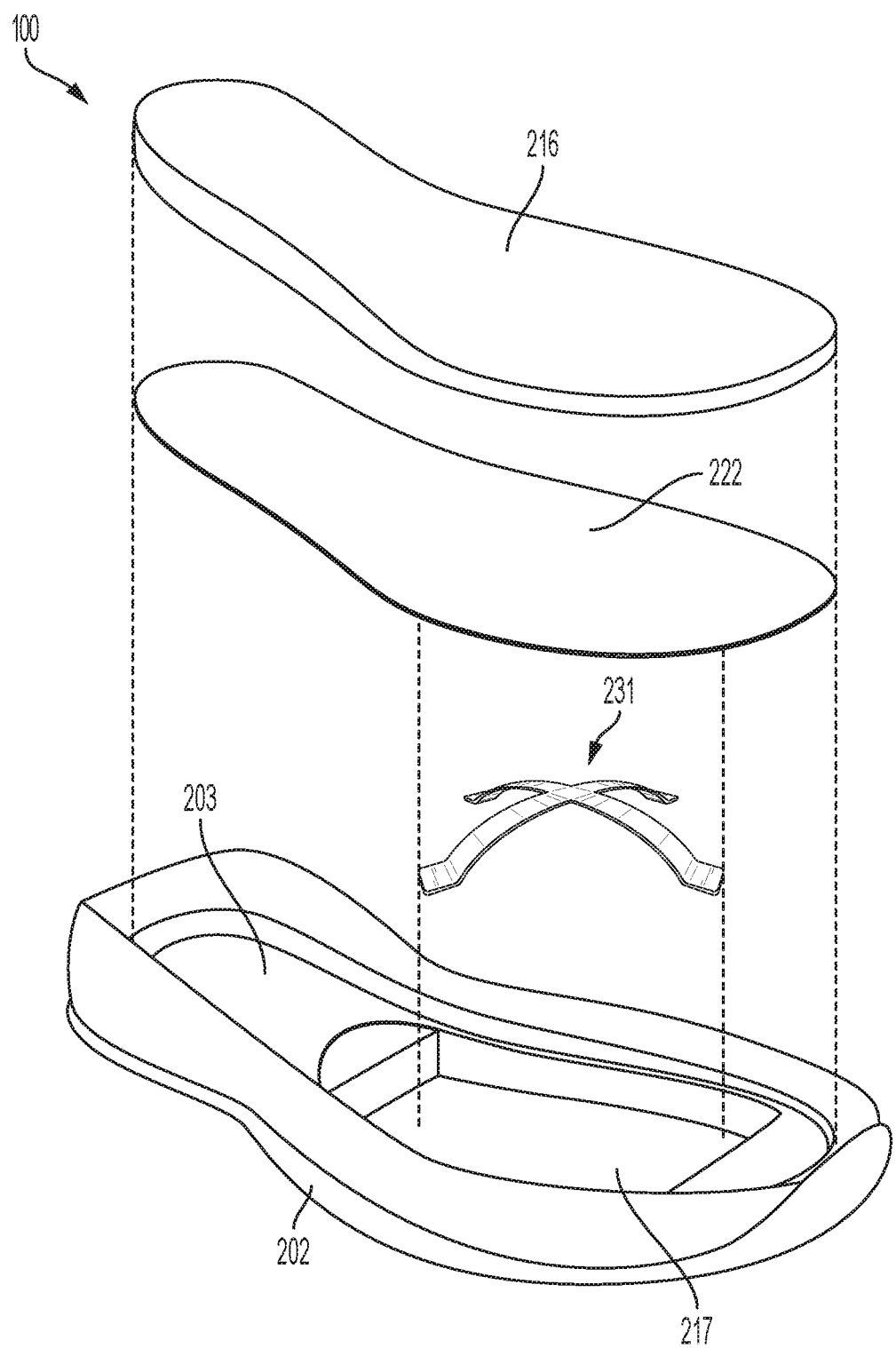
FIG. 2 shows an exploded view of a shoe including a device in accordance with an embodiment.

FIG. 2 shows an exploded view of the shoe 100 in accordance with an embodiment. The shoe 100 includes the outsole 202, the midsole 203, an insole 216, and a device 231. In various embodiments, the shoe further includes a plate 222. The insole 216 is located above the plate 222. There is a cavity or opening 217 in the midsole 203 into which at least a portion of the device 231 is insertable. For example, the device 231 may be positioned within the opening 217 in the midsole 203 such that bottom surfaces of the device 231 contact a top surface of the outsole 202. In some embodiments, the opening 217 is a partial opening in the midsole 203 forming a cavity in which the device 231 may be positioned such that bottom surfaces of the device 231 contact a surface of the midsole 203 within the cavity. Though not shown in FIG. 2, the shoe 100 can have other elements such as the upper 204 and the fastening member 205 as shown in FIG. 1. Referring to FIGS. 1 and 2, the shoe 100 also has the forefoot portion 101, ball portion 102, arch portion 103, and heel portion 104 in a longitudinal direction.

In various embodiments, the plate 222 is a carbon fiber plate. Also, in various embodiments, the plate 222 has a same or similar shape as the insole 216 in length and width directions. In some embodiments, the plate 222 has a shorter length than the insole 216. In various embodiments, the plate 222 extends across substantially an entire length of the shoe 100. For example, in some embodiments, the plate 222 extends within an area bounded by a wall of the midsole 203 at the back of the shoe 100 to a wall of the midsole 203 at the front of the shoe 100. In various embodiments, the plate 222 extends from the heel portion 104 of the shoe 100 and through the arch portion 103 and the ball portion 102 of the shoe 100 and into the forefoot portion 101 of the shoe 100. In some embodiments, there is a sockliner positioned above the insole 216 that is on an opposite side of the insole 216 from the plate 222. In various embodiments, the insole 216 comprises an ethylene-vinyl acetate (EVA) material, or the like. In various embodiments, the midsole 203 comprises a thermoplastic elastomer such as a polyether block amide (PEBA) material, such as the PEBA material known as Pebax® that is manufactured by ARKEMA. In some embodiments, a Shore type A durometer value of the midsole 203 is less than 40. In some embodiments, a Shore type A durometer value of the midsole 203 is greater than 40.

In various embodiments, the device 231 is an energy storage and return device that acts as a trampoline to store potential energy when compressed by a foot of a human wearing the shoe 100, and then to return energy to the foot of the human as the foot of the human is lifted. In various embodiments, a rear end of the device 231 is positioned near a half-way point of a length of the shoe 100 and the device 231 extends all the way to near a front of the shoe 100 where it would be under the toes of a user of the shoe 100. In various embodiments, the device 231 extends from a position in the arch portion 103 of the shoe 100 and through the ball portion 102 of the shoe 100 and into the forefoot portion 101 of the shoe 100 to near a front of the forefoot portion 101 of the shoe 100. In some embodiments, the device 231 is positioned entirely within the forefoot portion 101 of the shoe 100. In some embodiment, the device 231 is positioned entirely within the ball portion 102 of the shoe 100. In some embodiments, the device 231 is positioned entirely within the heel portion 104 of the shoe 100. Other positions of the device 231 within the shoe 100 are also possible.

In various embodiments, the plate 222 is glued or otherwise affixed to the device 231. For example, a top surface of the device 231 in various embodiments is glued to a bottom surface of the plate 222 during manufacture. In various embodiments, the plate 222 is affixed, such as being permanently affixed, to the device 231 such that the plate 222 works together with the device 231 to provide energy return to a user using the shoe 100. In various embodiments, the plate 222 is affixed to the device 231 such that an energy return of the plate 222 works with a kinetic release of the device 231 when a user is using the shoe 100. In some embodiments, the plate 222 is omitted from the shoe 100, and the device 231 has an upper surface in contact with a bottom surface of the insole 216.

Figure 3A:
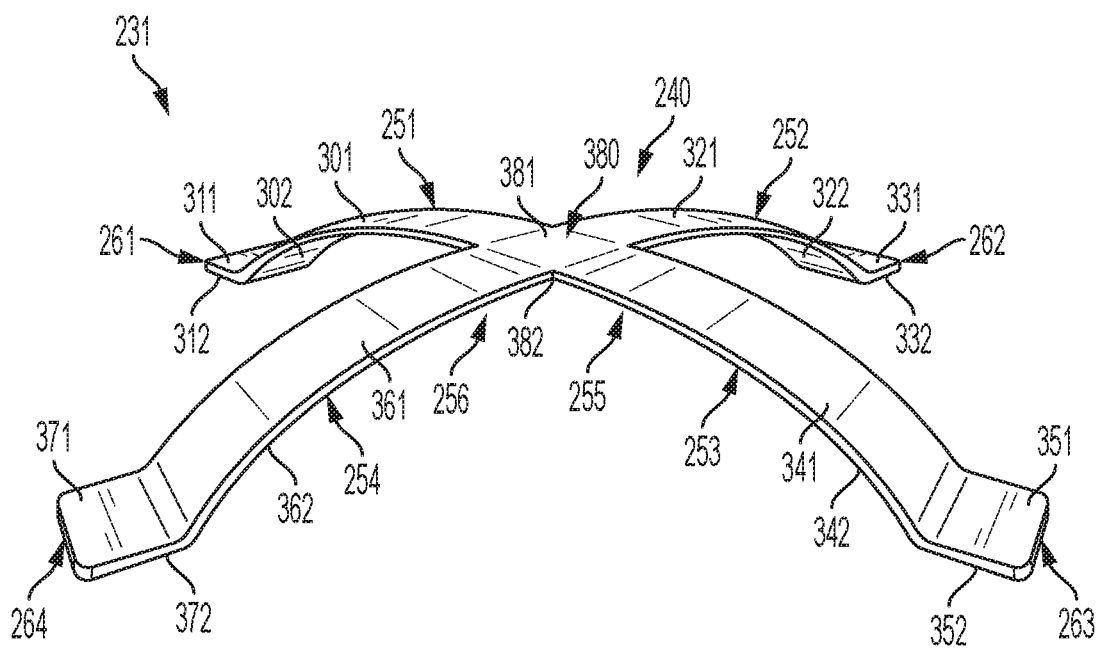
FIG. 3A shows the device from FIG. 2 for use in a shoe in accordance with an embodiment.

FIG. 3A shows the device 231 from FIG. 2 for use in a shoe in accordance with an embodiment. The device 231 includes an energy storage and return structure 240. The energy storage and return structure 240 includes a first foot 261, a second foot 262, a third foot 263, and a fourth foot 264, and a first flexible leg 251, a second flexible leg 252, a third flexible leg 253, and a fourth flexible leg 254. The first flexible leg 251 extends from the first foot 261 and is curved. The second flexible leg 252 extends from the second foot 262 and is curved. The third flexible leg 253 extends from the third foot 263 and is curved. The fourth flexible leg 254 extends from the fourth foot 264 and is curved. The first flexible leg 251, the second flexible leg 252, the third flexible leg 253, and the fourth flexible leg 254 are joined together with each other at a common area 380. In various embodiments, the first flexible leg 251, the second flexible leg 252, the third flexible leg 253, and the fourth flexible leg 254 are joined together with each other at the common area 380 by being manufactured as a single unit. The first flexible leg 251, the second flexible leg 252, the third flexible leg 253, and the fourth flexible leg 254 are configured to store energy when a force is applied to the common area 380, and are configured to return energy when the force is removed from the common area 380.

In various embodiments, the first foot 261, the second foot 262, the third foot 263, the fourth foot 264, the first flexible leg 251, the second flexible leg 252, the third flexible leg 253, and the fourth flexible leg 254 are formed as a single unit. In some embodiments, such a single unit is formed of carbon fiber. In some embodiments, such a single unit is formed of one or more of carbon fiber, rubber, poly-paraphenylene terephthalamide (known as Kevlar®), styrene, and/or a thermoplastic elastomer such as a polyether block amide (PEBA) material known as Pebax®. In various embodiments, the energy storage and return structure 240 is formed of one or more of carbon fiber, rubber, poly-paraphenylene terephthalamide (known as Kevlar®), styrene, and/or a thermoplastic elastomer such as a polyether block amide (PEBA) material known as Pebax®, or other material that allows for flexing and returning from a flexed state. In various embodiments, the common area 380 is at a central location with respect to locations of the first foot 261, the second foot 262, the third foot 263, and the fourth foot 264. In various embodiments, the common area 380 is raised in height as compared to a corresponding top surface of each of the first foot 261, the second foot 262, the third foot 263, and the fourth foot 264. In some embodiments, the first flexible leg 251, the second flexible leg 252, the third flexible leg 253, and the fourth flexible leg 254 each comprise one or more of carbon fiber, rubber, poly-paraphenylene terephthalamide (known as Kevlar®), styrene, and/or a thermoplastic elastomer such as a polyether block amide (PEBA) material known as Pebax®. In various embodiments, the device 231 is at least partially located in an opening in a midsole of a shoe.

In various embodiments, the first flexible leg 251 and the third flexible leg 253 together form a first arch 255 from the first foot 261 to the third foot 263. In various embodiments, the second flexible leg 252 and the fourth flexible leg 254 together form a second arch 256 from the second foot 262 to the fourth foot 264. In some embodiments, a center of the first arch 255 and a center of the second arch 256 are joined together as part of a single unit at the common area 380 and are angled with respect to each other.

The first flexible leg 251 has a top surface 301 and a bottom surface 302. The second flexible leg 252 has a top surface 321 and a bottom surface 322. The third flexible leg 253 has a top surface 341 and a bottom surface 342. The fourth flexible leg 254 has a top surface 361 and a bottom surface 362. The first foot 261 has a top surface 311 and a bottom surface 312. The second foot 262 has a top surface 331 and a bottom surface 332. The third foot 263 has a top surface 351 and a bottom surface 352. The fourth foot 264 has a top surface 371 and a bottom surface 372. The common area 380 has a top surface 381 and a bottom surface 382.

With reference to FIGS. 2 and 3A, in various embodiments, the device 231 is located at least partially within the opening 217 in the midsole 203 of the shoe 100 such that the bottom surface 312 of the first foot 261, the bottom surface 332 of the second foot 262, the bottom surface 352 of the third foot 263, and the bottom surface 372 of the fourth foot 264 are flat on a top surface of the outsole 202. In various embodiments, the device 231 is located entirely within the opening 217 in the midsole 203 of the shoe 100. In various embodiments, a first portion of a bottom surface of the plate 222 is glued to the top surface 381 of the common area 380 of the device 231, and a second portion of the bottom surface of the plate 222 lays on a surface of the midsole 203 of the shoe 100. Also, in various embodiments, the insole 216 lays on a top surface of the plate 222.

A method of using the device 231 in the shoe 100 in accordance with an embodiment includes applying force, such as from a foot of a human user, to the common area 380 at which the first flexible leg 251, the second flexible leg 252, the third flexible leg 253, and the fourth flexible leg 254 of the device 231 are joined together to cause the first flexible leg 251, the second flexible leg 252, the third flexible leg 253, and the fourth flexible leg 254 to flex to a flexed position, so as to store potential energy. In various embodiments, the method further includes releasing the force from the common area 380, such as by lifting the foot of the human user, to allow the first flexible leg 251, the second flexible leg 252, the third flexible leg 253, and the fourth flexible leg 254 to return back from the flexed position, so as to return energy to the foot of the human user. In various embodiments, the force is applied to the common area 380 from the foot of the human user by the foot of the human user pressing on the insole 216 to cause the plate 222 to apply the force to the common area 380.

Figure 3B:
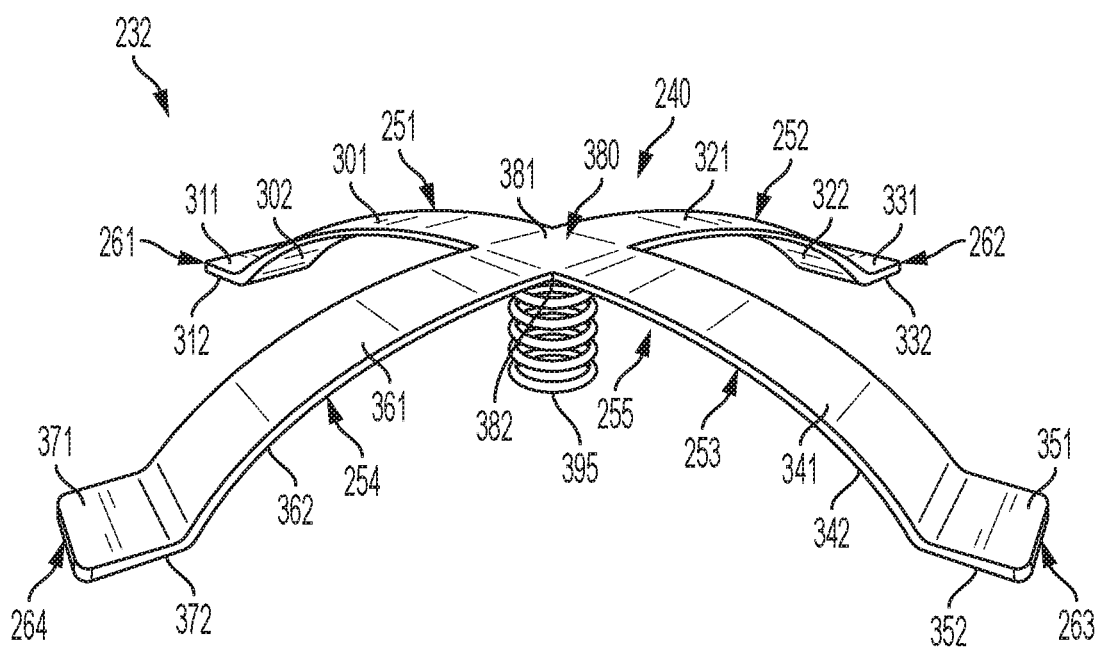
FIG. 3B shows another embodiment of a device that includes a center spring for use in a shoe.

FIG. 3B shows a device 232 in accordance with another embodiment. With reference to FIGS. 3A and 3B, the device 232 is similar to the device 231 and includes the energy storage and return structure 240 of the device 231, but the device 232 also includes a center spring 395 that is positioned on the bottom surface 382 of the common area 380. The label numbers in FIG. 3B that are the same as label numbers in FIG. 3A denote the same structures. In various embodiments, the spring 395 is a coil spring. In various other embodiments, the spring 395 is a wave spring or other type of spring. The spring 395 provides for additional energy storage and return when the device 232 is used in a shoe.

With reference to FIGS. 2 and 3B, the device 232 can be used in place of the device 231 in the shoe 100. In some embodiments, a bottom of the spring 395 would be in contact with a top surface of the outsole 202 when the device 232 is positioned at least partially within the opening 217 in the midsole 203 of the shoe 100. Also, in various embodiments, the bottom surface 312 of the first foot 261, the bottom surface 332 of the second foot 262, the bottom surface 352 of the third foot 263, and the bottom surface 372 of the fourth foot 264 are flat on a top surface of the outsole 202 when the device 232 is positioned at least partially within the opening 217 in the midsole 203 of the shoe 100. In various embodiments, the device 232 is located entirely within the opening 217 in the midsole 203 of the shoe 100. In various embodiments, a first portion of a bottom surface of the plate 222 is glued to the top surface 381 of the common area 380 of the device 232, and a second portion of the bottom surface of the plate 222 lays on a surface of the midsole 203 of the shoe 100. Also, in various embodiments, the insole 216 lays on a top surface of the plate 222.

A method of using the device 232 in the shoe 100 in accordance with an embodiment includes applying force, such as from a foot of a human user, to the common area 380 at which the first flexible leg 251, the second flexible leg 252, the third flexible leg 253, and the fourth flexible leg 254 of the device 232 are joined together to cause the center spring 395 to compress, and to cause the first flexible leg 251, the second flexible leg 252, the third flexible leg 253, and the fourth flexible leg 254 to flex to a flexed position, so as to store potential energy. In various embodiments, the method further includes releasing the force from the common area 380, such as by lifting the foot of the human user, to allow the center spring 395 to expand from the compressed state and to allow the first flexible leg 251, the second flexible leg 252, the third flexible leg 253, and the fourth flexible leg 254 to return back from the flexed position, so as to return energy to the foot of the human user. In various embodiments, the force is applied to the common area 380 from the foot of the human user by the foot of the human user pressing on the insole 216 to cause the plate 222 to apply the force to the common area 380.

Figure 3C:
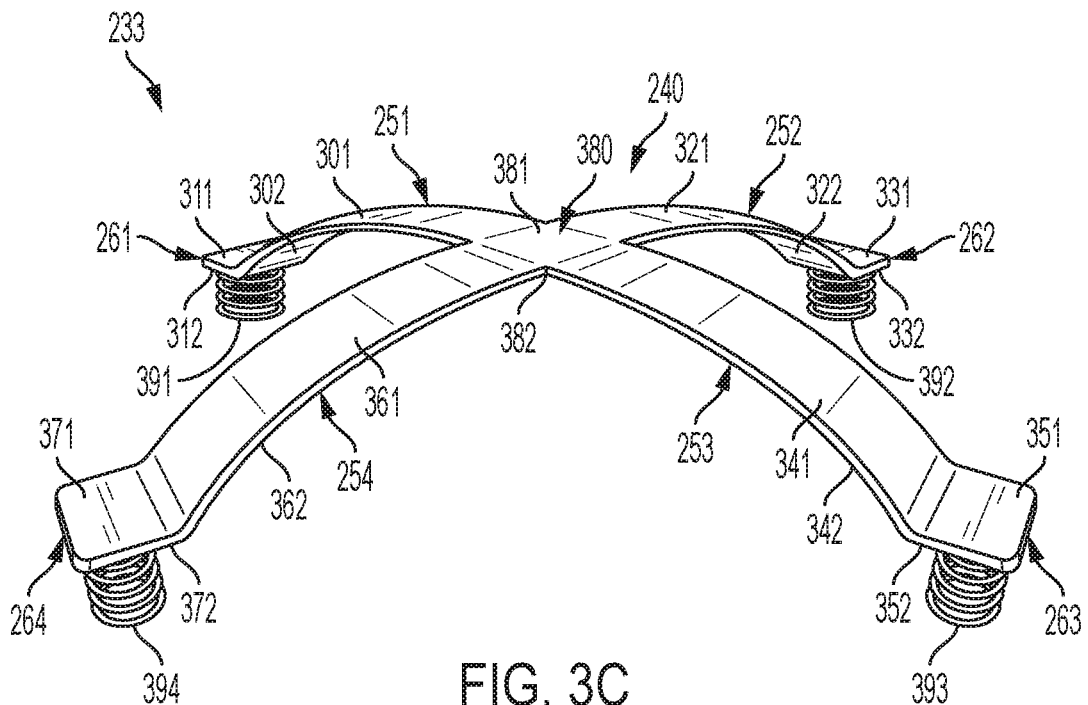
FIG. 3C shows another embodiment of a device that includes four side springs for use in a shoe.

FIG. 3C shows a device 233 in accordance with another embodiment. With reference to FIGS. 3A and 3C, the device 233 is similar to the device 231 and includes the energy storage and return structure 240 of the device 231, but the device 233 further includes a first spring 391 extending from the bottom surface 312 of the first foot 261, a second spring 392 extending from the bottom surface 332 of the second foot 262, a third spring 393 extending from the bottom surface 352 of the third foot 263, and a fourth spring 394 extending from the bottom surface 372 of the fourth foot 264. The label numbers in FIG. 3C that are the same as label numbers in FIG. 3A denote the same structures. In various embodiments, the first spring 391, the second spring 392, the third spring 393, and the fourth spring 394 are coil springs. In various other embodiments, the first spring 391, the second spring 392, the third spring 393, and the fourth spring 394 are wave springs or other types of springs. The first spring 391, the second spring 392, the third spring 393, and the fourth spring 394 provide for additional energy storage and return when the device 233 is used in a shoe.

With reference to FIGS. 2 and 3C, the device 233 can be used in place of the device 231 in the shoe 100. In some embodiments, a corresponding bottom of each of the first spring 391, the second spring 392, the third spring 393, and the fourth spring 394 would be in contact with a top surface of the outsole 202 when the device 233 is positioned at least partially within the opening 217 in the midsole 203 of the shoe 100. In various embodiments, the device 233 is located entirely within the opening 217 in the midsole 203 of the shoe 100. In various embodiments, a first portion of a bottom surface of the plate 222 is glued to the top surface 381 of the common area 380 of the device 233, and a second portion of the bottom surface of the plate 222 lays on a surface of the midsole 203 of the shoe 100. Also, in various embodiments, the insole 216 lays on a top surface of the plate 222.

A method of using the device 233 in the shoe 100 in accordance with an embodiment includes applying force, such as from a foot of a human user, to the common area 380 at which the first flexible leg 251, the second flexible leg 252, the third flexible leg 253, and the fourth flexible leg 254 of the device 233 are joined together to cause the first spring 391, the second spring 392, the third spring 393, and the fourth spring 394 to compress, and to cause the first flexible leg 251, the second flexible leg 252, the third flexible leg 253, and the fourth flexible leg 254 to flex to a flexed position, so as to store potential energy. In various embodiments, the method further includes releasing the force from the common area 380, such as by lifting the foot of the human user, to allow the first spring 391, the second spring 392, the third spring 393, and the fourth spring 394 to expand from the compressed state and to allow the first flexible leg 251, the second flexible leg 252, the third flexible leg 253, and the fourth flexible leg 254 to return back from the flexed position, so as to return energy to the foot of the human user. In various embodiments, the force is applied to the common area 380 from the foot of the human user by the foot of the human user pressing on the insole 216 to cause the plate 222 to apply the force to the common area 380.

Figure 3D:
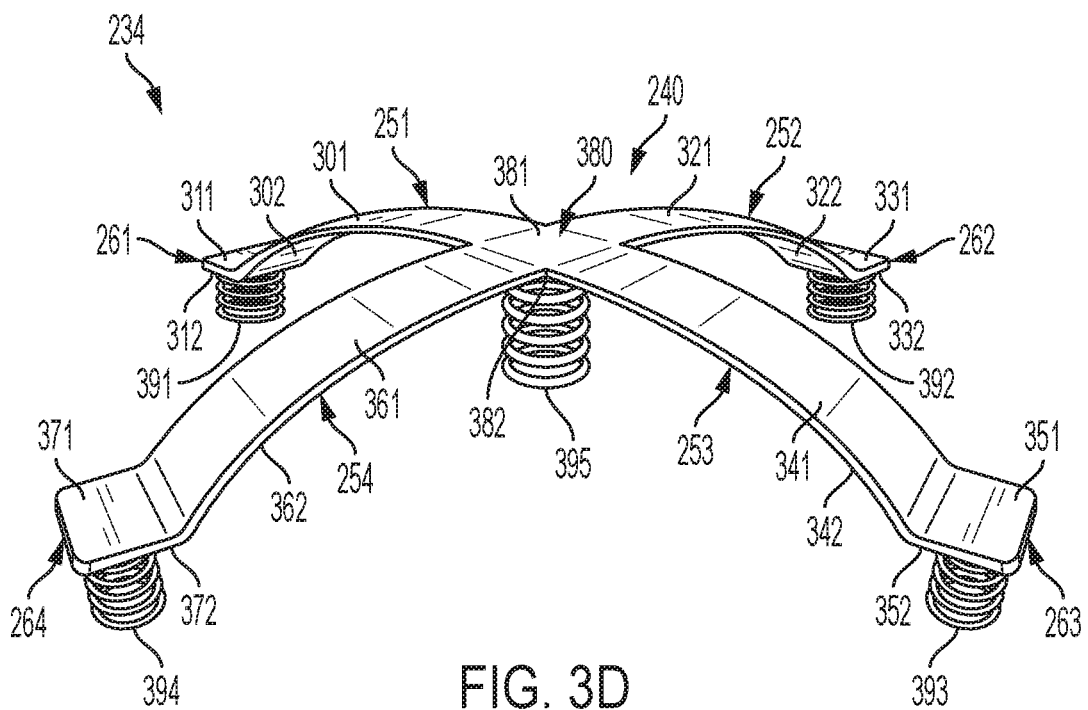
FIG. 3D shows another embodiment of a device that includes a center spring and four side springs for use in a shoe.

FIG. 3D shows a device 234 in accordance with another embodiment. With reference to FIGS. 3A and 3D, the device 234 is similar to the device 231 and includes the energy storage and return structure 240 of the device 231, but the device 234 further includes the first spring 391 extending from the bottom surface 312 of the first foot 261, the second spring 392 extending from the bottom surface 332 of the second foot 262, the third spring 393 extending from the bottom surface 352 of the third foot 263, the fourth spring 394 extending from the bottom surface 372 of the fourth foot 264, and the center spring 395 that is a fifth spring extending from the bottom surface 382 of the common area 380. The label numbers in FIG. 3D that are the same as label numbers in FIG. 3A denote the same structures. In various embodiments, the first spring 391, the second spring 392, the third spring 393, the fourth spring 394, and the center spring 395 are coil springs. In various other embodiments, the first spring 391, the second spring 392, the third spring 393, the fourth spring 394, and the center spring 395 are wave springs or other types of springs. The first spring 391, the second spring 392, the third spring 393, the fourth spring 394, and the center spring 395 provide for additional energy storage and return when the device 234 is used in a shoe.

With reference to FIGS. 2 and 3D, the device 234 can be used in place of the device 231 in the shoe 100. In some embodiments, a corresponding bottom of each of the first spring 391, the second spring 392, the third spring 393, the fourth spring 394, and the center spring 395 would be in contact with a top surface of the outsole 202 when the device 234 is positioned at least partially within the opening 217 in the midsole 203 of the shoe 100. In various embodiments, the device 234 is located entirely within the opening 217 in the midsole 203 of the shoe 100. In various embodiments, a first portion of a bottom surface of the plate 222 is glued to the top surface 381 of the common area 380 of the device 234, and a second portion of the bottom surface of the plate 222 lays on a surface of the midsole 203 of the shoe 100. Also, in various embodiments, the insole 216 lays on a top surface of the plate 222.

A method of using the device 234 in the shoe 100 in accordance with an embodiment includes applying force, such as from a foot of a human user, to the common area 380 at which the first flexible leg 251, the second flexible leg 252, the third flexible leg 253, and the fourth flexible leg 254 of the device 234 are joined together to cause the first spring 391, the second spring 392, the third spring 393, the fourth spring 394, and the center spring 395 to compress, and to cause the first flexible leg 251, the second flexible leg 252, the third flexible leg 253, and the fourth flexible leg 254 to flex to a flexed position, so as to store potential energy. In various embodiments, the method further includes releasing the force from the common area 380, such as by lifting the foot of the human user, to allow the first spring 391, the second spring 392, the third spring 393, the fourth spring 394, and the center spring 395 to expand from the compressed state and to allow the first flexible leg 251, the second flexible leg 252, the third flexible leg 253, and the fourth flexible leg 254 to return back from the flexed position, so as to return energy to the foot of the human user. In various embodiments, the force is applied to the common area 380 from the foot of the human user by the foot of the human user pressing on the insole 216 to cause the plate 222 to apply the force to the common area 380.

Figure 4A:
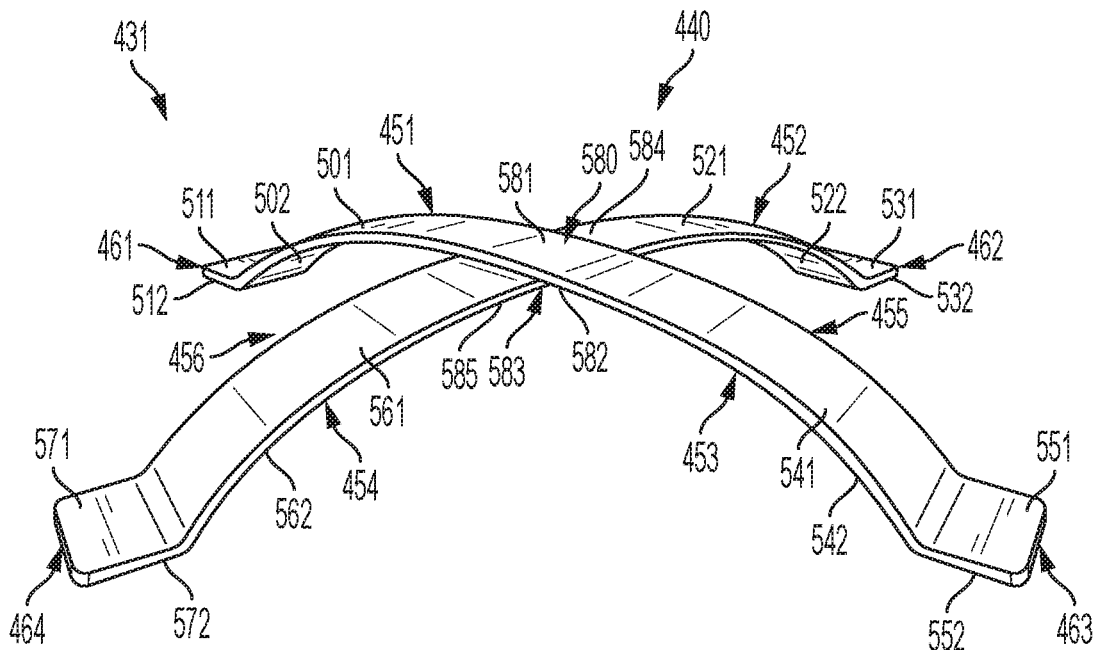
FIG. 4A shows another embodiment of a device for use in a shoe.

FIG. 4A shows a device 431 in accordance with another embodiment for use in a shoe. The device 431 includes an energy storage and return structure 440. The energy storage and return structure 440 includes a first foot 461, a second foot 462, a third foot 463, and a fourth foot 464, and a first flexible leg 451, a second flexible leg 452, a third flexible leg 453, and a fourth flexible leg 454. The first flexible leg 451 extends from the first foot 461 and is curved. The second flexible leg 452 extends from the second foot 462 and is curved. The third flexible leg 453 extends from the third foot 463 and is curved. The fourth flexible leg 454 extends from the fourth foot 464 and is curved. The first flexible leg 451 and the third flexible leg 453 are joined together with each other as a single unit to form a first arch 455 from the first foot 461 to the third foot 463. In various embodiments, the first flexible leg 451 and the third flexible leg 453 are joined together with each other by being manufactured as a single unit that is continuous as the first arch 455 from the first foot 461 to the third foot 463. The second flexible leg 452 and the fourth flexible leg 454 are joined together with each other as a single unit to form a second arch 456 from the second foot 462 to the fourth foot 464. In various embodiments, the second flexible leg 452 and the fourth flexible leg 454 are joined together with each other by being manufactured as a single unit that is continuous as the second arch 456 from the second foot 462 to the fourth foot 464. The second arch 456 has a center portion 583 that is located under a center portion 580 of the first arch 455.

In various embodiments, the first foot 461, the second foot 462, the third foot 463, the fourth foot 464, the first flexible leg 451, the second flexible leg 452, the third flexible leg 453, and the fourth flexible leg 454 are formed of one or more of carbon fiber, poly-paraphenylene terephthalamide (known as Kevlar®), styrene, and/or a thermoplastic elastomer such as a polyether block amide (PEBA) material known as Pebax®. In various embodiments, the energy storage and return structure 440 is formed of one or more of carbon fiber, rubber, poly-paraphenylene terephthalamide (known as Kevlar®), styrene, and/or a thermoplastic elastomer such as a polyether block amide (PEBA) material known as Pebax®, or other material that allows for flexing and returning from a flexed state. In various embodiments, the center portion 580 of the first arch 455 is at a central location with respect to locations of the first foot 461, the second foot 462, the third foot 463, and the fourth foot 464. In various embodiments, the center portion 580 is raised in height as compared to a corresponding top surface of each of the first foot 461, the second foot 462, the third foot 463, and the fourth foot 464. In some embodiments, the first flexible leg 451, the second flexible leg 452, the third flexible leg 453, and the fourth flexible leg 454 each comprise one or more of carbon fiber, poly-paraphenylene terephthalamide (known as Kevlar®), styrene, and/or a thermoplastic elastomer such as a polyether block amide (PEBA) material known as Pebax®. In various embodiments, the device 431 is at least partially located in an opening in a midsole of a shoe.

The first flexible leg 451 has a top surface 501 and a bottom surface 502. The second flexible leg 452 has a top surface 521 and a bottom surface 522. The third flexible leg 453 has a top surface 541 and a bottom surface 542. The fourth flexible leg 454 has a top surface 561 and a bottom surface 562. The first foot 461 has a top surface 511 and a bottom surface 512. The second foot 462 has a top surface 531 and a bottom surface 532. The third foot 463 has a top surface 551 and a bottom surface 552. The fourth foot 464 has a top surface 571 and a bottom surface 572. The center portion 580 of the first arch 455 has a top surface 581 and a bottom surface 582. The center portion 583 of the second arch 456 has a top surface 584 and a bottom surface 585.

With reference to FIGS. 2 and 4A, the device 431 can be used in place of the device 231 in the shoe 100. In various embodiments, the device 431 is located at least partially within the opening 217 in the midsole 203 of the shoe 100 such that the bottom surface 512 of the first foot 461, the bottom surface 532 of the second foot 462, the bottom surface 552 of the third foot 463, and the bottom surface 572 of the fourth foot 464 are flat on a top surface of the outsole 202. In various embodiments, a first portion of a bottom surface of the plate 222 is glued to the top surface 581, and a second portion of the bottom surface of the plate 222 lays on a surface of the midsole 203 of the shoe 100. Also, in various embodiments, the insole 216 lays on a top surface of the plate 222.

A method of using the device 431 in the shoe 100 in accordance with an embodiment includes applying force to the center portion 580 of the first arch 455 to cause force to be applied to the center portion 583 of the second arch 456, so as to cause the first flexible leg 451, the second flexible leg 452, the third flexible leg 453, and the fourth flexible leg 454 to flex to a flexed position, so as to store potential energy. In various embodiments, the method further includes releasing the force from the center portion 580 of the first arch 455 to allow the first flexible leg 451, the second flexible leg 452, the third flexible leg 453, and the fourth flexible leg 454 to return back from the flexed position, so as to return energy. In various embodiments, the center portion 583 of the second arch 456 is located below the center portion 580 of the first arch 455.

Figure 4B:
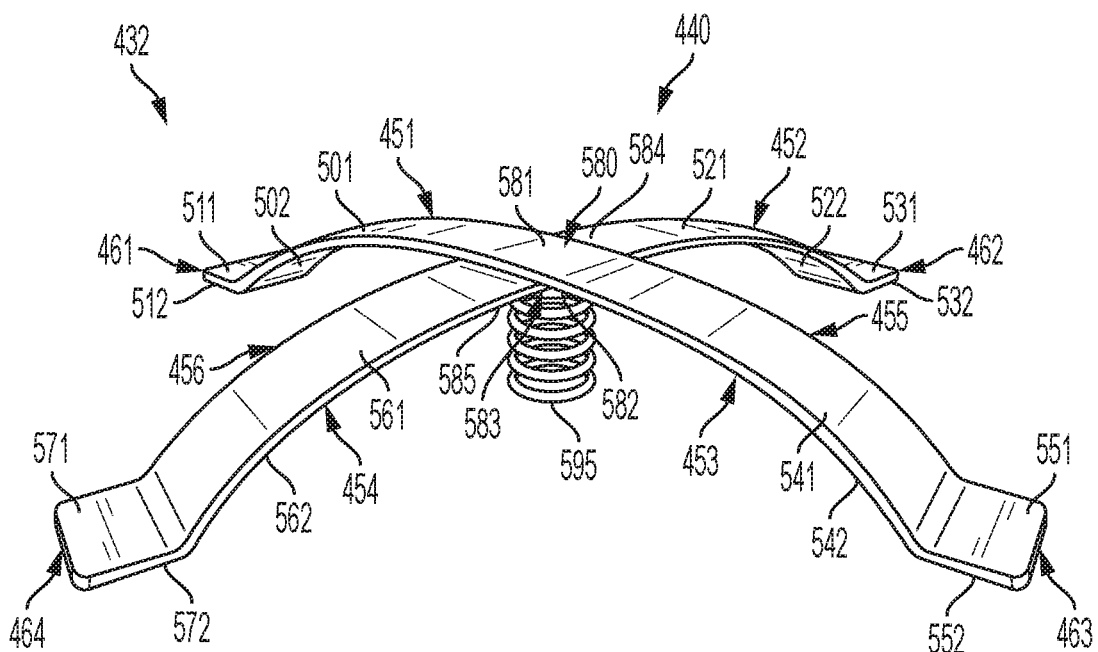
FIG. 4B shows another embodiment of a device that includes a center spring for use in a shoe.

FIG. 4B shows a device 432 in accordance with another embodiment. With reference to FIGS. 4A and 4B, the device 432 is similar to the device 431 and includes the energy storage and return structure 440 of the device 431, but the device 432 further includes a spring 595 that is positioned on the bottom surface 585 of the center portion 583 of the second arch 456. The label numbers in FIG. 4B that are the same as label numbers in FIG. 4A denote the same structures. In various embodiments, the spring 595 is a coil spring. In various other embodiments, the spring 595 is a wave spring or other type of spring. The spring 595 provides for additional energy storage and return when the device 432 is used in a shoe.

With reference to FIGS. 2 and 4B, the device 432 can be used in place of the device 231 in the shoe 100. In some embodiments, a bottom of the spring 595 would be in contact with a top surface of the outsole 202 when the device 432 is positioned at least partially within the opening 217 in the midsole 203 of the shoe 100. In various embodiments, the bottom surface 512 of the first foot 461, the bottom surface 532 of the second foot 462, the bottom surface 552 of the third foot 463, and the bottom surface 572 of the fourth foot 464 are flat on a top surface of the outsole 202. In various embodiments, a first portion of a bottom surface of the plate 222 is glued to the top surface 581, and a second portion of the bottom surface of the plate 222 lays on a surface of the midsole 203 of the shoe 100. Also, in various embodiments, the insole 216 lays on a top surface of the plate 222.

A method of using the device 432 in the shoe 100 in accordance with an embodiment includes applying force to the center portion 580 to cause force to be applied to the center portion 583, so as to cause the first flexible leg 451, the second flexible leg 452, the third flexible leg 453, and the fourth flexible leg 454 to flex to a flexed position, and to compress the spring 595, so as to store potential energy. In various embodiments, the method further includes releasing the force from the center portion 580 to allow the first flexible leg 451, the second flexible leg 452, the third flexible leg 453, and the fourth flexible leg 454 to return back from the flexed position, and to allow the spring 595 to expand from the compressed state so as to return energy.

Figure 5A:
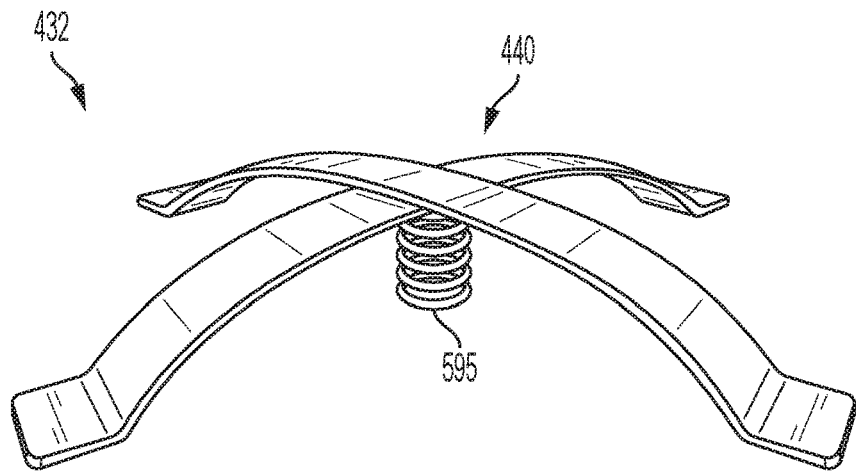
FIGS. 5A, 5B, and 5C show example states of the device of FIG. 4B, where
Figure 5B:
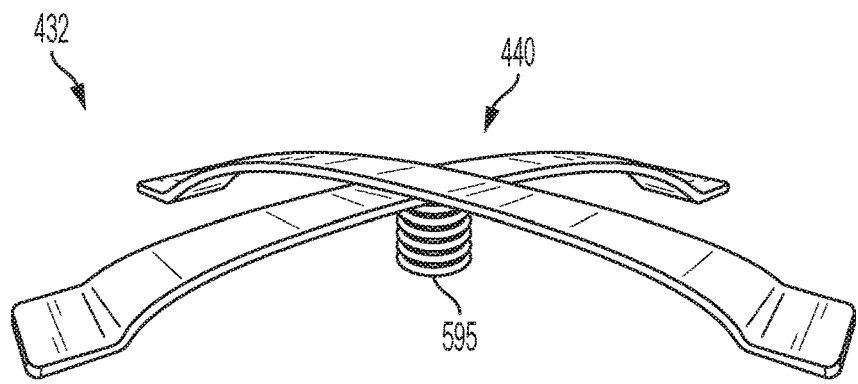
Figure 5C:
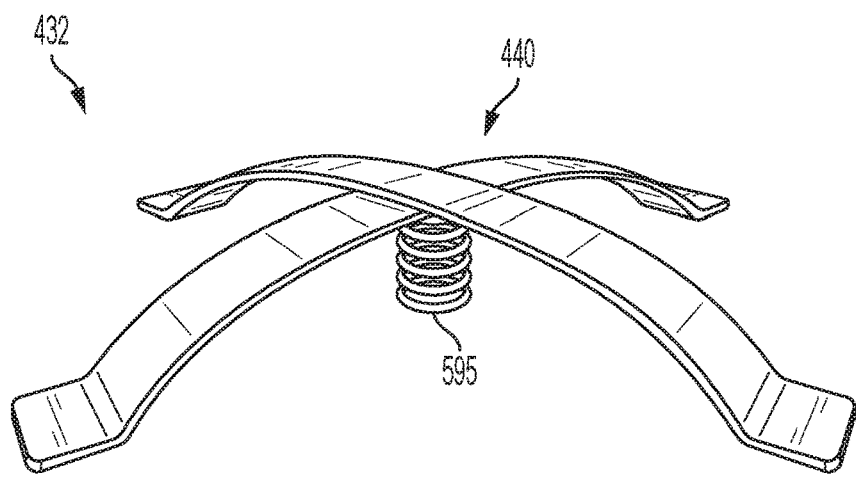

FIGS. 5A, 5B, and 5C show stages of the device 432 during use. FIG. 5A shows the device 432 with the energy storage and return structure 440 and the spring 595 prior to a force being applied. FIG. 5B shows the device 432 with the energy storage and return structure 440 and the spring 595 when the force is applied to place the device 432 under pressure. FIG. 5C shows the device 432 with the energy storage and return structure 440 and the spring 595 when the force has been removed to allow the device 432 to bounce back and return energy.

Figure 4C:
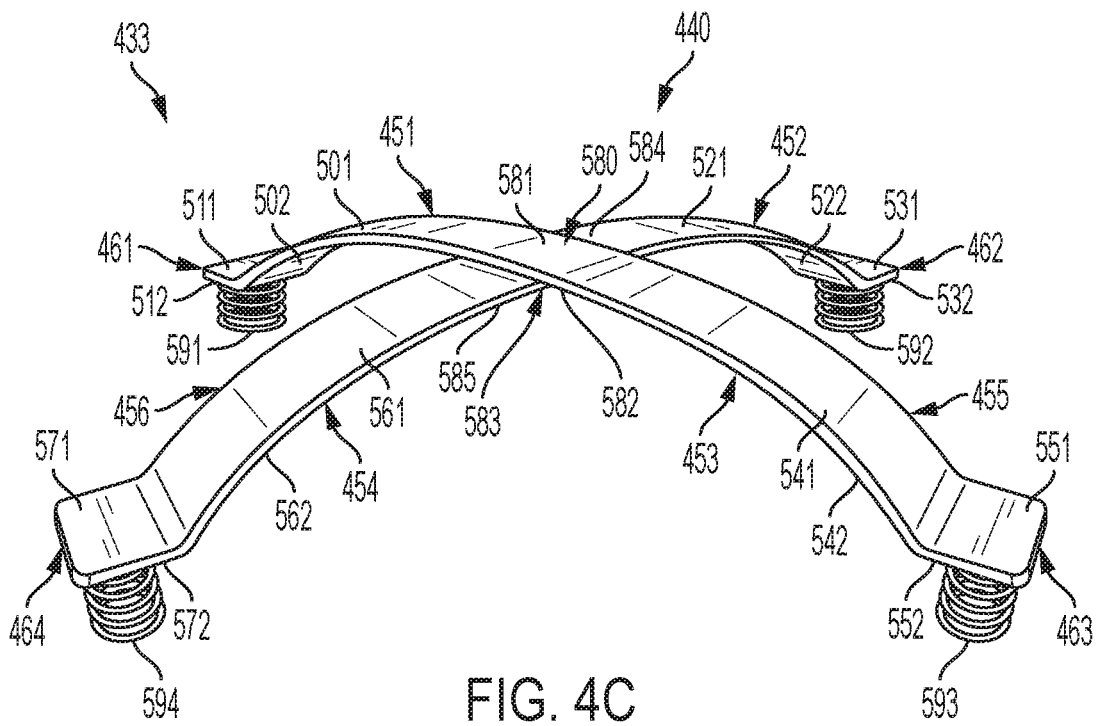
FIG. 4C shows another embodiment of a device that includes four side springs for use in a shoe.

FIG. 4C shows a device 433 in accordance with another embodiment. With reference to FIGS. 4A and 4C, the device 433 is similar to the device 431 and includes the energy storage and return structure 440 of the device 431, but the device 433 further includes a first spring 591 extending from the bottom surface 512 of the first foot 461, a second spring 592 extending from the bottom surface 532 of the second foot 462, a third spring 593 extending from the bottom surface 552 of the third foot 463, and a fourth spring 594 extending from the bottom surface 572 of the fourth foot 464. The label numbers in FIG. 4C that are the same as label numbers in FIG. 4A denote the same structures. In various embodiments, the first spring 591, the second spring 592, the third spring 593, and the fourth spring 594 are coil springs. In various other embodiments, they are wave springs or other types of springs. The first spring 591, the second spring 592, the third spring 593, and the fourth spring 594 provide for additional energy storage and return when the device 433 is used in a shoe.

With reference to FIGS. 2 and 4C, the device 433 can be used in place of the device 231 in the shoe 100. In some embodiments, a corresponding bottom of each of the first spring 591, the second spring 592, the third spring 593, and the fourth spring 594 would be in contact with a top surface of the outsole 202 when the device 433 is positioned at least partially within the opening 217 in the midsole 203 of the shoe 100. In various embodiments, a first portion of a bottom surface of the plate 222 is glued to the top surface 581, and a second portion of the bottom surface of the plate 222 lays on a surface of the midsole 203 of the shoe 100. Also, in various embodiments, the insole 216 lays on a top surface of the plate 222.

A method of using the device 433 in the shoe 100 in accordance with an embodiment includes applying force to the center portion 580 to cause force to be applied to the center portion 583, so as to cause the first flexible leg 451, the second flexible leg 452, the third flexible leg 453, and the fourth flexible leg 454 to flex to a flexed position, and to compress the first spring 591, the second spring 592, the third spring 593, and the fourth spring 594, so as to store potential energy. In various embodiments, the method further includes releasing the force from the center portion 580 to allow the first flexible leg 451, the second flexible leg 452, the third flexible leg 453, and the fourth flexible leg 454 to return back from the flexed position, and to allow the first spring 591, the second spring 592, the third spring 593, and the fourth spring 594 to expand from the compressed state so as to return energy.

Figure 4D:
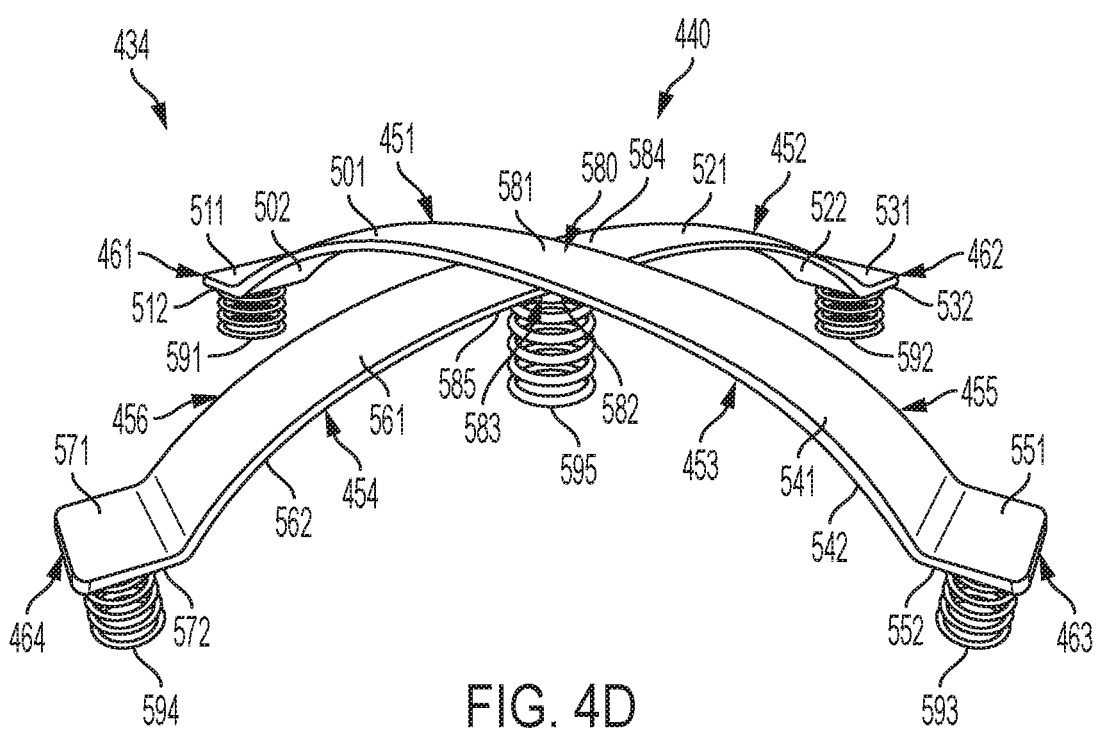
FIG. 4D shows another embodiment of a device that includes a center spring and four side springs for use in a shoe.

FIG. 4D shows a device 434 in accordance with another embodiment. With reference to FIGS. 4A and 4D, the device 434 is similar to the device 431 and includes the energy storage and return structure 440 of the device 431, but the device 434 further includes the first spring 591 extending from the bottom surface 512 of the first foot 461, the second spring 592 extending from the bottom surface 532 of the second foot 462, the third spring 593 extending from the bottom surface 552 of the third foot 463, the fourth spring 594 extending from the bottom surface 572 of the fourth foot 464, and the spring 595 that is a fifth spring and that is positioned on the bottom surface 585 of the center portion 583 of the second arch 456. The label numbers in FIG. 4D that are the same as label numbers in FIG. 4A denote the same structures. In various embodiments, the first spring 591, the second spring 592, the third spring 593, the fourth spring 594, and the spring 595 are coil springs. In various other embodiments, they are wave springs or other types of springs. The first spring 591, the second spring 592, the third spring 593, the fourth spring 594, and the spring 595 provide for additional energy storage and return when the device 434 is used in a shoe.

With reference to FIGS. 2 and 4D, the device 434 can be used in place of the device 231 in the shoe 100. In some embodiments, a corresponding bottom of each of the first spring 591, the second spring 592, the third spring 593, the fourth spring 594, and the spring 595 would be in contact with a top surface of the outsole 202 when the device 434 is positioned at least partially within the opening 217 in the midsole 203 of the shoe 100. In various embodiments, a first portion of a bottom surface of the plate 222 is glued to the top surface 581, and a second portion of the bottom surface of the plate 222 lays on a surface of the midsole 203 of the shoe 100. Also, in various embodiments, the insole 216 lays on a top surface of the plate 222.

A method of using the device 434 in the shoe 100 in accordance with an embodiment includes applying force to the center portion 580 to cause force to be applied to the center portion 583, so as to cause the first flexible leg 451, the second flexible leg 452, the third flexible leg 453, and the fourth flexible leg 454 to flex to a flexed position, and to compress the first spring 591, the second spring 592, the third spring 593, the fourth spring 594, and the spring 595 so as to store potential energy. In various embodiments, the method further includes releasing the force from the center portion 580 to allow the first flexible leg 451, the second flexible leg 452, the third flexible leg 453, and the fourth flexible leg 454 to return back from the flexed position, and to allow the first spring 591, the second spring 592, the third spring 593, the fourth spring 594, and the spring 595 to expand from the compressed state so as to return energy.

Figure 6:
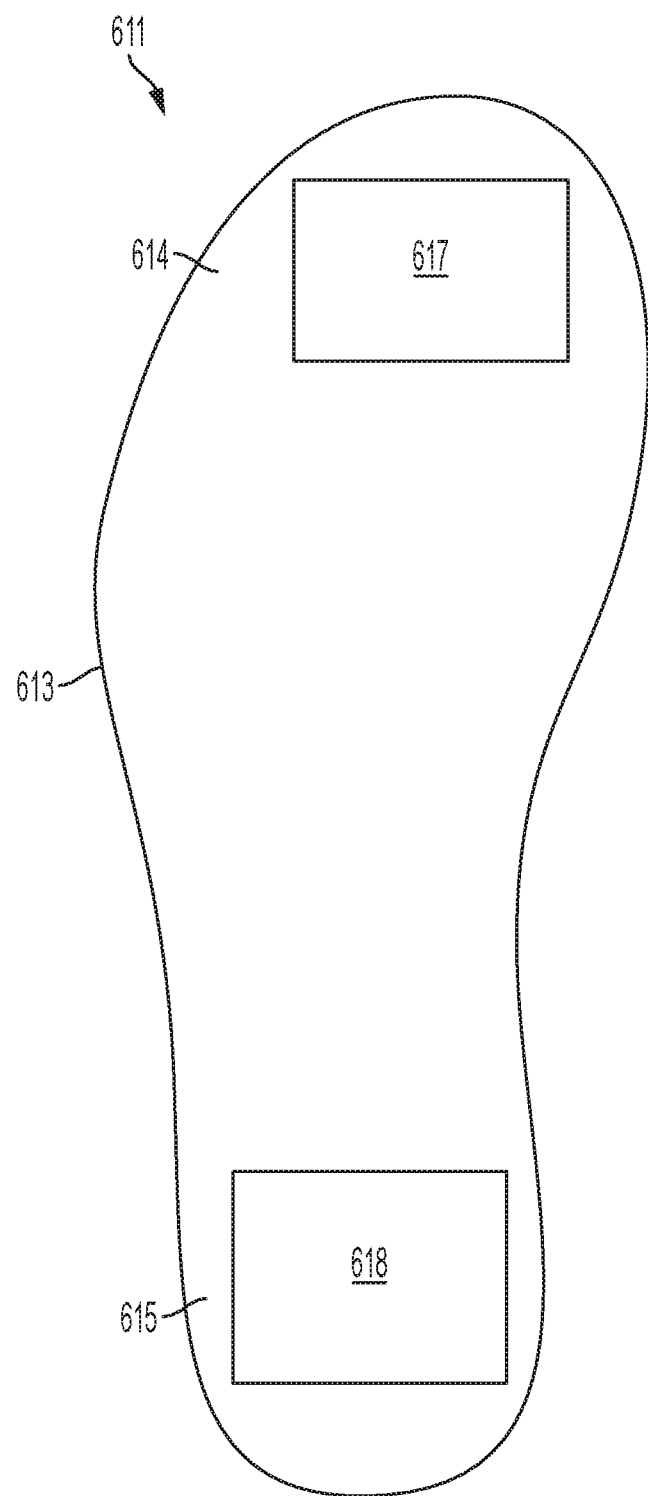
FIG. 6 shows a portion of an embodiment of a shoe illustrating exemplary locations at which one or more devices in accordance with any of the embodiments may be located.

FIG. 6 shows a portion of an embodiment of a shoe 611 illustrating exemplary locations at which one or more devices in accordance with any of the embodiments of FIGS. 3A, 3B, 3C, 3D, 4A, 4B, 4C, and 4D may be located. Referring to FIG. 6, the shoe 611 includes a midsole 613. In various embodiments, there is an opening 617 in a forefoot portion 614 of the midsole 613. In various embodiments, there is an opening 618 in a heel portion 615 of the midsole 613. In various embodiments, there is the opening 617 in the forefoot portion 614 of the midsole 613 and the opening 618 in the heel portion 615 of the midsole 613.

With reference to FIGS. 3A, 3B, 3C, 3D, 4A, 4B, 4C, 4D, and 6, in various embodiments, any of the devices 231, 232, 233, 234, 431, 432, 433, and 434 is positionable at least partially within the opening 617 in the forefoot portion 614 of the midsole 613. In various embodiments, any of the devices 231, 232, 233, 234, 431, 432, 433, and 434 is positionable at least partially within the opening 618 in the heel portion 615 of the midsole 613. In various embodiments, one device that is structured such as any of the devices 231, 232, 233, 234, 431, 432, 433, and 434 is positioned at least partially within the opening 617 in the forefoot portion 614 of the midsole 613, and another device that is structured such as any of the devices 231, 232, 233, 234, 431, 432, 433, and 434 is positioned at least partially within the opening 618 in the heel portion 615 of the midsole 613.

In some embodiments, there is no opening in a heel portion of a midsole of a shoe, and there is just a device such as any of the devices 231, 232, 233, 234, 431, 432, 433, and 434 that is positioned at least partially within an opening in the forefoot portion of the midsole of the shoe. In some embodiments, there is no opening in a forefoot portion of a midsole of a shoe, and there is just a device such as any of the devices 231, 232, 233, 234, 431, 432, 433, and 434 that is positioned at least partially within an opening in a heel portion of the shoe. Any of the devices 231, 232, 233, 234, 431, 432, 433, and 434 could be located at other locations within a shoe, such as in any of a forefoot portion, ball portion, arch portion, and/or heel portion of a shoe. Also, different ones of any of the devices 231, 232, 233, 234, 431, 432, 433, and 434 could be located in a same shoe in different locations.

Figure 7:
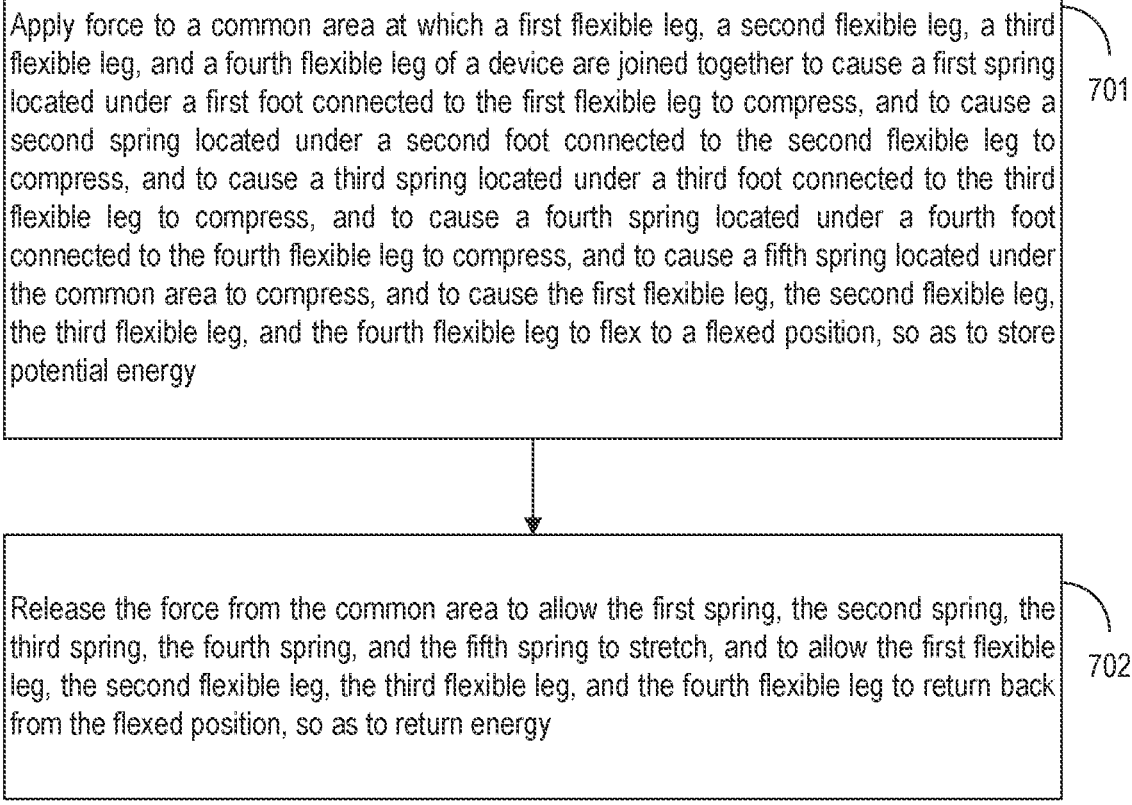
FIG. 7 is a flowchart of a method in accordance with an embodiment.

FIG. 7 is a flowchart of a method of using a device in a shoe in accordance with an embodiment. In step 701, a force is applied to a common area at which a first flexible leg, a second flexible leg, a third flexible leg, and a fourth flexible leg of the device are joined together to cause a first spring located under a first foot connected to the first flexible leg to compress, and to cause a second spring located under a second foot connected to the second flexible leg to compress, and to cause a third spring located under a third foot connected to the third flexible leg to compress, and to cause a fourth spring located under a fourth foot connected to the fourth flexible leg to compress, and to cause a fifth spring located under the common area to compress, and to cause the first flexible leg, the second flexible leg, the third flexible leg, and the fourth flexible leg to flex to a flexed position, so as to store potential energy. In various embodiments, the force is applied to the common area by a user of the shoe.

In step 702, the force is released from the common area to allow the first spring, the second spring, the third spring, the fourth spring, and the fifth spring to stretch, and to allow the first flexible leg, the second flexible leg, the third flexible leg, and the fourth flexible leg to return back from the flexed position, so as to return energy.

Figure 8:
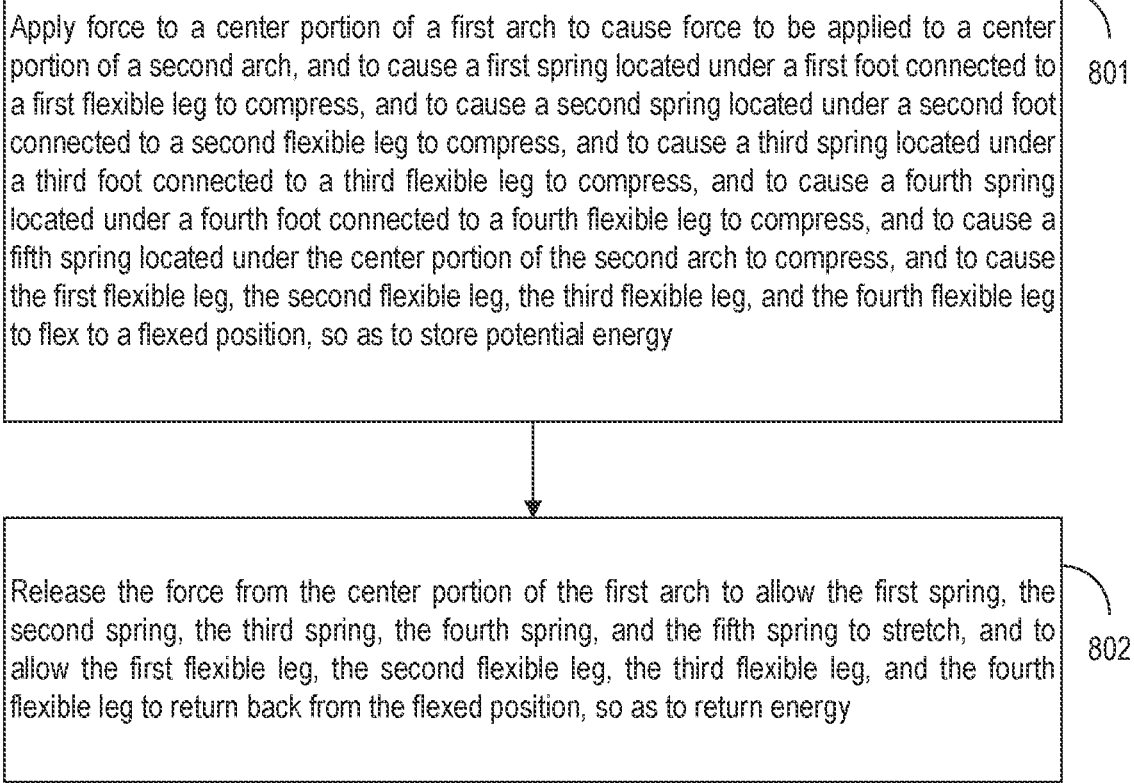
FIG. 8 is a flowchart of a method in accordance with an embodiment.

FIG. 8 is a flowchart of a method of using a device in a shoe in accordance with another embodiment. The device includes a first flexible leg, a second flexible leg, a third flexible leg, and a fourth flexible leg. The first flexible leg and the third flexible leg together form a first arch. The second flexible leg and the fourth flexible leg together form a second arch.

In step 801, the method includes applying a force to a center portion of the first arch to cause force to be applied to a center portion of the second arch, and to cause a first spring located under a first foot connected to the first flexible leg to compress, and to cause a second spring located under a second foot connected to the second flexible leg to compress, and to cause a third spring located under a third foot connected to the third flexible leg to compress, and to cause a fourth spring located under a fourth foot connected to the fourth flexible leg to compress, and to cause a fifth spring located under the center portion of the second arch to compress, and to cause the first flexible leg, the second flexible leg, the third flexible leg, and the fourth flexible leg to flex to a flexed position, so as to store potential energy. In various embodiments, the force is applied to the center portion of the first arch by a user of the shoe.

In step 802, the method includes releasing the force from the center portion of the first arch to allow the first spring, the second spring, the third spring, the fourth spring, and the fifth spring to stretch, and to allow the first flexible leg, the second flexible leg, the third flexible leg, and the fourth flexible leg to return back from the flexed position, so as to return energy. In various embodiments, the center portion of the second arch is located below the center portion of the first arch.

The embodiments disclosed herein are to be considered in all respects as illustrative, and not restrictive of the invention. For example, in various other embodiments, additional flexible legs forming additional arches, as well as additional springs could be added to one or more of the devices. The present invention is in no way limited to the embodiments described above. Various modifications and changes may be made to the embodiments without departing from the spirit and scope of the invention.

What is claimed is:

1. A device for use in a shoe, the device comprising:
  a first foot, a second foot, a third foot, and a fourth foot;
  a first flexible leg that extends from the first foot and is curved;
  a second flexible leg that extends from the second foot and is curved;
  a third flexible leg that extends from the third foot and is curved;
  a fourth flexible leg that extends from the fourth foot and is curved;
  a first coil spring extending from a bottom surface of the first foot, the first coil spring having a bottom end for contacting a top surface of an outsole of the shoe;
  a second coil spring extending from a bottom surface of the second foot, the second coil spring having a bottom end for contacting the top surface of the outsole of the shoe;
  a third coil spring extending from a bottom surface of the third foot, the third coil spring having a bottom end for contacting the top surface of the outsole of the shoe; and
  a fourth coil spring extending from a bottom surface of the fourth foot, the fourth coil spring having a bottom end for contacting the top surface of the outsole of the shoe;
  wherein the first flexible leg, the second flexible leg, the third flexible leg, and the fourth flexible leg are joined together with each other at a common area; and
  wherein the bottom end of the first coil spring, the bottom end of the second coil spring, the bottom end of the third coil spring, and the bottom end of the fourth coil spring are all separate from each other for providing four separate contacts with the top surface of the outsole of the shoe.

2. The device of claim 1,
  wherein the first flexible leg, the second flexible leg, the third flexible leg, and the fourth flexible leg are configured to store energy when a force is applied to the common area, and are configured to return energy when the force is removed from the common area.

3. The device of claim 1,
  wherein the common area is at a central location with respect to locations of the first foot, the second foot, the third foot, and the fourth foot.

4. The device of claim 1,
  wherein the common area is raised in height as compared to a corresponding top surface of each of the first foot, the second foot, the third foot, and the fourth foot.

5. The device of claim 1,
  wherein the first flexible leg, the second flexible leg, the third flexible leg, and the fourth flexible leg each comprise carbon fiber.

6. The device of claim 1,
  wherein the device is at least partially located in an opening in a midsole of the shoe.

7. The device of claim 1, further comprising:
  a fifth coil spring extending from a bottom surface of the common area, the fifth coil spring having a bottom end for contacting the top surface of the outsole of the shoe;
  wherein the bottom end of the fifth coil spring is separate from the bottom end of the first coil spring, the bottom end of the second coil spring, the bottom end of the third coil spring, and the bottom end of the fourth coil spring.

8. The device of claim 1,
  wherein the first flexible leg and the third flexible leg together form a first arch;
  wherein the second flexible leg and the fourth flexible leg together form a second arch; and
  wherein a center of the first arch and a center of the second arch are joined together at the common area.

9. A method of using a device in a shoe, the method comprising:
  applying force to a common area at which a first flexible leg, a second flexible leg, a third flexible leg, and a fourth flexible leg of the device are joined together to cause a first coil spring located under a first foot connected to the first flexible leg to compress, and to cause a second coil spring located under a second foot connected to the second flexible leg to compress, and to cause a third coil spring located under a third foot connected to the third flexible leg to compress, and to cause a fourth coil spring located under a fourth foot connected to the fourth flexible leg to compress, and to cause a fifth coil spring located under the common area to compress, and to cause the first flexible leg, the second flexible leg, the third flexible leg, and the fourth flexible leg to flex to a flexed position, so as to store potential energy; and
  releasing the force from the common area to allow the first coil spring, the second coil spring, the third coil spring, the fourth coil spring, and the fifth coil spring to stretch, and to allow the first flexible leg, the second flexible leg, the third flexible leg, and the fourth flexible leg to return back from the flexed position, so as to return energy;
  wherein a bottom end of the first coil spring, a bottom end of the second coil spring, a bottom end of the third coil spring, a bottom end of the fourth coil spring, and a bottom end of the fifth coil spring are all separate from each other such that each separately contacts a top surface of an outsole of the shoe.

10. The device of claim 1,
wherein the first flexible leg, the second flexible leg, the third flexible leg, and the fourth flexible leg each comprise rubber.

11. The device of claim 1,
wherein the first flexible leg, the second flexible leg, the third flexible leg, and the fourth flexible leg each comprise a thermoplastic elastomer.

12. The device of claim 1,
wherein the common area is raised in height as compared to a corresponding top surface of each of the first foot, the second foot, the third foot, and the fourth foot; and
wherein the device further includes a fifth coil spring extending from a bottom surface of the common area.

13. The device of claim 12,
wherein the common area is at a central location with respect to locations of the first foot, the second foot, the third foot, and the fourth foot.

14. The device of claim 12,
wherein the first flexible leg and the third flexible leg together form a first arch;
wherein the second flexible leg and the fourth flexible leg together form a second arch; and
wherein a center of the first arch and a center of the second arch are joined together at the common area.

15. The device of claim 12,
wherein the first flexible leg, the second flexible leg, the third flexible leg, and the fourth flexible leg each comprise carbon fiber.

16. A device for use in a shoe, the device comprising:
a first foot, a second foot, a third foot, and a fourth foot;
a first flexible leg that extends from the first foot and is curved;
a second flexible leg that extends from the second foot and is curved;
a third flexible leg that extends from the third foot and is curved;
a fourth flexible leg that extends from the fourth foot and is curved;
a first wave spring extending from a bottom surface of the first foot, the first wave spring having a bottom end for contacting a top surface of an outsole of the shoe;
a second wave spring extending from a bottom surface of the second foot, the second wave spring having a bottom end for contacting the top surface of the outsole of the shoe;
a third wave spring extending from a bottom surface of the third foot, the third wave spring having a bottom end for contacting the top surface of the outsole of the shoe; and
a fourth wave spring extending from a bottom surface of the fourth foot, the fourth wave spring having a bottom end for contacting the top surface of the outsole of the shoe;
wherein the first flexible leg, the second flexible leg, the third flexible leg, and the fourth flexible leg are joined together with each other at a common area; and
wherein the bottom end of the first wave spring, the bottom end of the second wave spring, the bottom end of the third wave spring, and the bottom end of the fourth wave spring are all separate from each other for providing four separate contacts with the top surface of the outsole of the shoe.

17. The device of claim 16,
wherein the common area is at a central location with respect to locations of the first foot, the second foot, the third foot, and the fourth foot.

18. The device of claim 17,
wherein the common area is raised in height as compared to a corresponding top surface of each of the first foot, the second foot, the third foot, and the fourth foot.

19. The device of claim 16,
wherein the first flexible leg and the third flexible leg together form a first arch;
wherein the second flexible leg and the fourth flexible leg together form a second arch; and
wherein a center of the first arch and a center of the second arch are joined together at the common area.

20. The device of claim 16, further comprising:
a fifth wave spring extending from a bottom surface of the common area, the fifth wave spring having a bottom end for contacting the top surface of the outsole of the shoe;
wherein the bottom end of the fifth wave spring is separate from the bottom end of the first wave spring, the bottom end of the second wave spring, the bottom end of the third wave spring, and the bottom end of the fourth wave spring.

\* \* \* \* \*